(12) United States Patent
Noguchi

(10) Patent No.: US 10,790,901 B2
(45) Date of Patent: Sep. 29, 2020

(54) RECEPTION DEVICE, TRANSMISSION DEVICE, OPTICAL COMMUNICATION SYSTEM, AND OPTICAL COMMUNICATION METHOD

(71) Applicant: NEC Corporation, Minato-ku, Tokyo (JP)

(72) Inventor: Hidemi Noguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/470,652

(22) PCT Filed: Dec. 19, 2017

(86) PCT No.: PCT/JP2017/045467
§ 371 (c)(1),
(2) Date: Jun. 18, 2019

(87) PCT Pub. No.: WO2018/123717
PCT Pub. Date: Jul. 5, 2018

(65) Prior Publication Data
US 2019/0326987 A1   Oct. 24, 2019

(30) Foreign Application Priority Data
Dec. 28, 2016   (JP) ................................. 2016-255189

(51) Int. Cl.
*H04B 10/079* (2013.01)
*H04B 10/69* (2013.01)
(Continued)

(52) U.S. Cl.
CPC ... *H04B 10/07953* (2013.01); *H04B 10/6972* (2013.01); *H04J 14/02* (2013.01);
(Continued)

(58) Field of Classification Search
None
See application file for complete search history.

(56) References Cited

U.S. PATENT DOCUMENTS

| 2009/0135761 A1* | 5/2009 | Khandekar | ........... H04L 5/0053 370/328 |
| 2016/0157075 A1* | 6/2016 | Ho | ........................ H04W 24/04 455/404.2 |

(Continued)

FOREIGN PATENT DOCUMENTS

WO   2015/120894 A1   8/2015

OTHER PUBLICATIONS

Koji Igarashi et al., "Ultra-Long-Haul High-Capacity Super-Nyquist-WDM Transmission Experiment Using Multi-Core Fibers", Journal of Lightwave Technology, Mar. 1, 2015, vol. 33, No. 5, pp. 1027-1036 (10 pages total).
(Continued)

*Primary Examiner* — Darren E Wolf

(57) ABSTRACT

A reception device 20 is configured to include a separation means 21 and a plurality of optical reception means 22. Each optical reception means 22 is configured to further include an optical/electrical conversion means 23 and a band restoration means 24. The separation means 21 separates a multiplexed signal into which signals of respective channels to which spectral shaping that narrows bandwidth to less than or equal to a baud rate is applied are multiplexed at spacings less than or equal to the baud rate on the transmission side into optical signals for the respective channels. Each optical/electrical conversion means 23 converts an optical signal to an electrical signal as a reception signal. Each band restoration means 24 applies processing having inverse characteristics to those of the band narrowing filter processing to the reception signal and restores the band of the reception signal.

17 Claims, 18 Drawing Sheets

(51) Int. Cl.
*H04J 14/02* (2006.01)
*H04B 10/07* (2013.01)
*H04B 10/66* (2013.01)
H04B 10/25 (2013.01)
H04B 10/40 (2013.01)
H04B 10/43 (2013.01)

(52) U.S. Cl.
CPC ............ *H04B 10/07* (2013.01); *H04B 10/079* (2013.01); *H04B 10/0795* (2013.01); *H04B 10/25* (2013.01); *H04B 10/40* (2013.01); *H04B 10/43* (2013.01); *H04B 10/66* (2013.01); *H04B 10/69* (2013.01); *H04B 10/697* (2013.01)

(56) References Cited

U.S. PATENT DOCUMENTS

| | | | |
|---|---|---|---|
| 2016/0277118 A1 | 9/2016 | Châtelain et al. | |
| 2018/0054793 A1* | 2/2018 | Renaldi | H04L 67/18 |
| 2018/0063676 A1* | 3/2018 | Mycek | H04B 17/318 |

OTHER PUBLICATIONS

Written Opinion in International Application No. PCT/JP2017/045467, dated Mar. 20, 2018.
International Search Report in International Application No. PCT/JP2017/045467, dated Mar. 20, 2018.

\* cited by examiner

SIGNAL SPECTRUM OF NRZ WAVEFORM

SIGNAL SPECTRUM OF NYQUIST WAVEFORM

WAVELENGTH-DIVISION-MULTIPLEXING IMAGE OF NYQUIST METHOD

SIGNAL SPECTRUM OF SUPER-NYQUIST WAVEFORM

WAVELENGTH-DIVISION-MULTIPLEXING IMAGE OF SUPER-NYQUIST METHOD

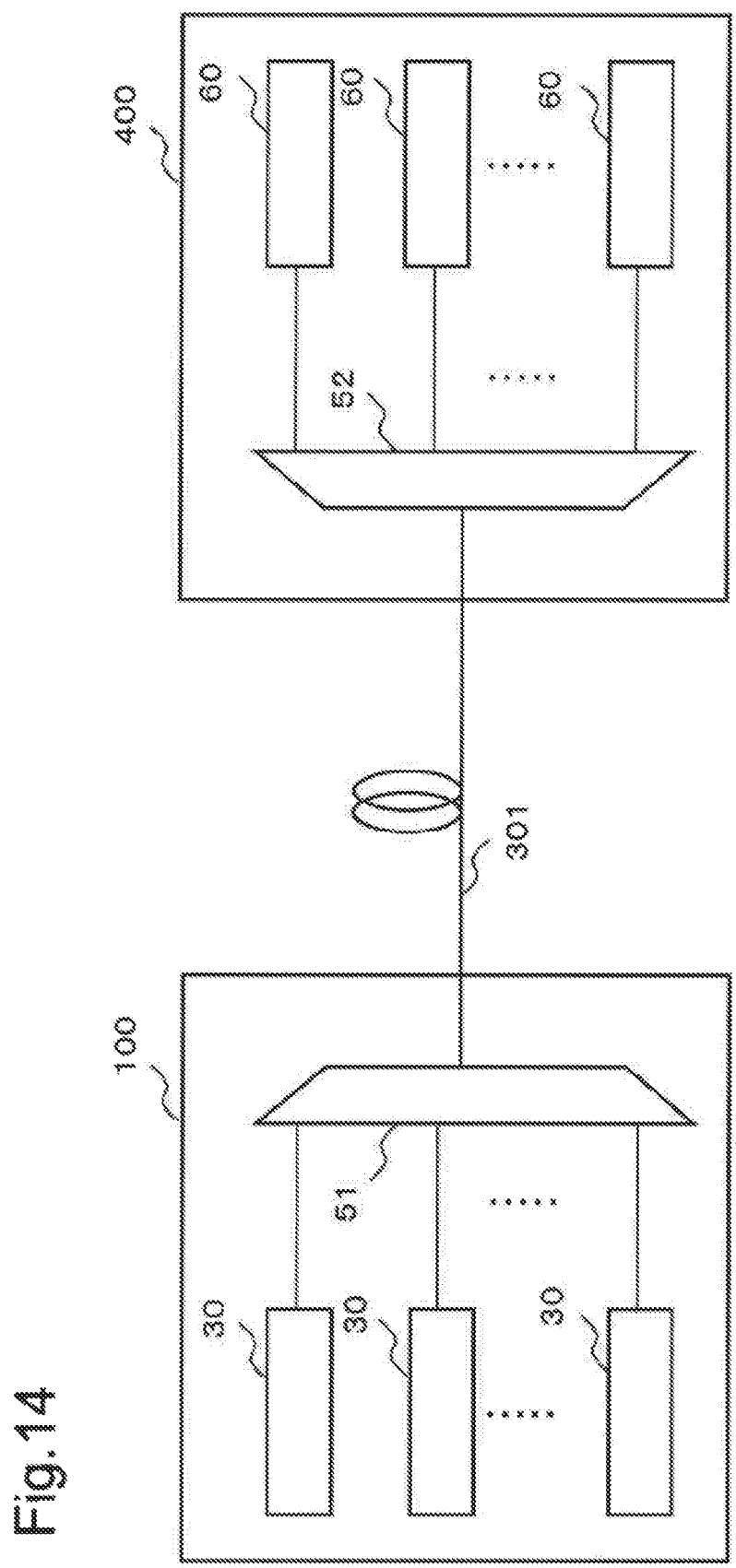

RECEPTION DEVICE, TRANSMISSION DEVICE, OPTICAL COMMUNICATION SYSTEM, AND OPTICAL COMMUNICATION METHOD

This application is a National Stage Entry of PCT/JP2017/045467 filed on Dec. 19, 2017, which claims priority from Japanese Patent Application 2016-255189 filed on Dec. 28, 2016, the contents of all of which are incorporated herein by reference, in their entirety.

TECHNICAL FIELD

The present invention relates to an optical communication system, and particularly relates to an optical communication system using a super-Nyquist method.

BACKGROUND ART

Recent years, in large capacity trunk line optical communication systems having a capacity of over 100 Giga bit per second (Gbps), a digital coherent method has been used. In such optical communication systems, communication based on a multi-level modulation scheme, such as a quadrature phase shift keying (QPSK) method and 16-quadrature amplitude modulation (QAM), has been put to practical use. Aiming at further increasing capacity, development of higher order multi-level modulation scheme, such as 32-QAM and 64-QAM, has been under way.

In parallel with such capacity increase through multi-level schemes, research and development of transmission methods improving frequency usage efficiency by narrowing signal bands and wavelength-division-multiplexing the signals (wavelength division multiplexer (WDM)) has been actively conducted. Typical examples of such transmission methods include a Nyquist transmission method that enables further band narrowing of signal spectra than transmission based on a non-return zero (NRZ) scheme, which has been widely used so far. Advanced signal bandwidth narrowing technologies, such as a super-Nyquist transmission method in which signal bandwidth is made narrower than a signal baud rate, have also been researched. As described above, an approach to narrow channel spacings at the time of wavelength division multiplex transmission by narrowing signal bandwidth and thereby increase transmission capacity per optical fiber is regarded as important, as well as the multi-level scheme.

In particular, for an optical transmission system having a capacity of over 1 Tera bit per second (Tbps), a subcarrier multiplexing method in which a plurality of subcarriers are multiplexed and 1 Tbps transmission is thereby achieved is effective in consideration of feasibility. Since frequency usage efficiency increases as subcarriers become more densely spaced, a technology for performing transmission through narrowing spacings at which subcarriers are multiplexed becomes important. Thus, development of technologies for performing wavelength-division-multiplexed transmission through narrowing subcarrier spacings has been actively conducted. As the technology for performing wavelength-division-multiplexed transmission through narrowing subcarrier spacings, for example, a technology described in NPL 1 has been disclosed.

An optical transmission system in NPL 1 is a communication system that performs transmission of polarization-multiplexed multi-level optical signals in accordance with the digital coherent method. In the optical transmission system in NPL 1, spectral shaping processing for narrowing the band of main signals is applied. NPL 1 asserts that performing band narrowing, while enabling inter-channel interference to be suppressed, enables wavelength-division-multiplexing spacings to be narrowed.

CITATION LIST

Non Patent Literature

[NPL 1] Koji Igarashi et al., "Ultra-Long-Haul High-Capacity Super-Nyquist-WDM Transmission Experiment Using Multi-Core Fibers", JOURNAL OF LIGHTWAVE TECHNOLOGY, Mar. 1, 2015, VOL. 33, NO. 5, p 1027-1036

SUMMARY OF INVENTION

Technical Problem

However, the technology in NPL 1 is not sufficient in respect of the following point. When the band narrowing processing that narrows bandwidth to less than a signal baud rate is applied to signals to be transmitted, the Nyquist's first criterion becomes not satisfied, which causes distortion to occur on main signal waveforms. As the band is made narrower, influence from such waveform distortion becomes more notable and substantially deteriorates transmission characteristics. In NPL 1, a method of, against such characteristic deterioration due to waveform distortion, restoring transmission symbols using a maximum likelihood estimation algorithm, typified by a maximum likelihood sequence estimation (MLSE) equalizer, is disclosed. The method assumes that adaptive equalization on the reception side that achieves dynamic waveform shaping processing, typified by polarization separation and polarization mode dispersion compensation, will be appropriately performed. Therefore, the method cannot cope with a state in which demodulation processing is unstable, such as a case where convergence of the adaptive equalization deteriorates due to waveform distortion or the adaptive equalization does not converge. That is, there is a possibility that, when the band narrowing is applied on the transmission side in order to transmit signals having bandwidth less than or equal to a baud rate as in the super-Nyquist method, waveform distortion becomes notable and, thus, signals cannot be restored correctly on the reception side and communication becomes unstable. Therefore, the method disclosed in NPL 1 is not sufficient as a technology for transmitting signals into which subcarriers are multiplexed at spacings less than or equal to a baud rate as in the super-Nyquist method and performing communication stably.

An object of the present invention is to, in order to solve the above-described problem, obtain a reception device, a transmission device, and an optical communication method that enable communication in which subcarriers are multiplexed at spacings less than or equal to a baud rate to be performed stably.

Solution to Problem

In order to solve the above-described problem, a transmission device of the present invention includes a plurality of optical transmission means and a multiplexing means. Each optical transmission means further includes a band narrowing means and an electrical/optical conversion means. Each band narrowing means applies processing of performing spectral shaping that narrows bandwidth of a signal to less than or equal to a baud rate as band narrowing filter processing, based on a parameter shared in advance with a reception side. Each electrical/optical conversion means, based on the signal the bandwidth of which a band narrowing means has narrowed to less than or equal to the baud rate, generates an optical signal corresponding to a respectively assigned channel. The multiplexing means multiplexes optical signals of respective channels output from the plurality of optical transmission means into a multiplexed signal at spacings less than or equal to the baud rate and outputs the multiplexed signal.

A reception device of the present invention includes a separation means and a plurality of optical reception means. Each optical reception means further includes an optical/electrical conversion means and a band restoration means. The separation means separates a multiplexed signal into which signals of respective channels to which spectral shaping that narrows bandwidth to less than or equal to a baud rate is applied as band narrowing filter processing are multiplexed at spacings less than or equal to the baud rate on a transmission side into optical signals for the respective channels. Each optical/electrical conversion means converts an optical signal of the respectively assigned channel to an electrical signal and outputs the electrical signal as a reception signal. Each band restoration means applies processing having inverse characteristics to those of the band narrowing filter processing to a reception signal as band restoration filter processing, based on a parameter shared in advance with the transmission side and thereby restores a band of the reception signal.

An optical communication method of the present invention separates a multiplexed signal into which signals of respective channels to which spectral shaping that narrows bandwidth to less than or equal to a baud rate is applied as band narrowing filter processing are multiplexed at spacings less than or equal to the baud rate into optical signals for the respective channels. The optical communication method of the present invention converts the optical signals of the respectively assigned channels to electrical signals and outputs the electrical signals as reception signals. The optical communication method of the present invention applies processing having inverse characteristics to those of the band narrowing filter processing to the reception signals as band restoration filter processing, based on a parameter shared in advance with a transmission side and thereby restores bands of the reception signals.

Advantageous Effects of Invention

The present invention enables communication in which subcarriers are multiplexed at spacings less than or equal to a baud rate to be performed stably.

BRIEF DESCRIPTION OF DRAWINGS

FIG. 14 is a diagram illustrating an outline of a configuration of a third example embodiment according to the present invention;

EXAMPLE EMBODIMENT

First Example Embodiment

Figure 1:
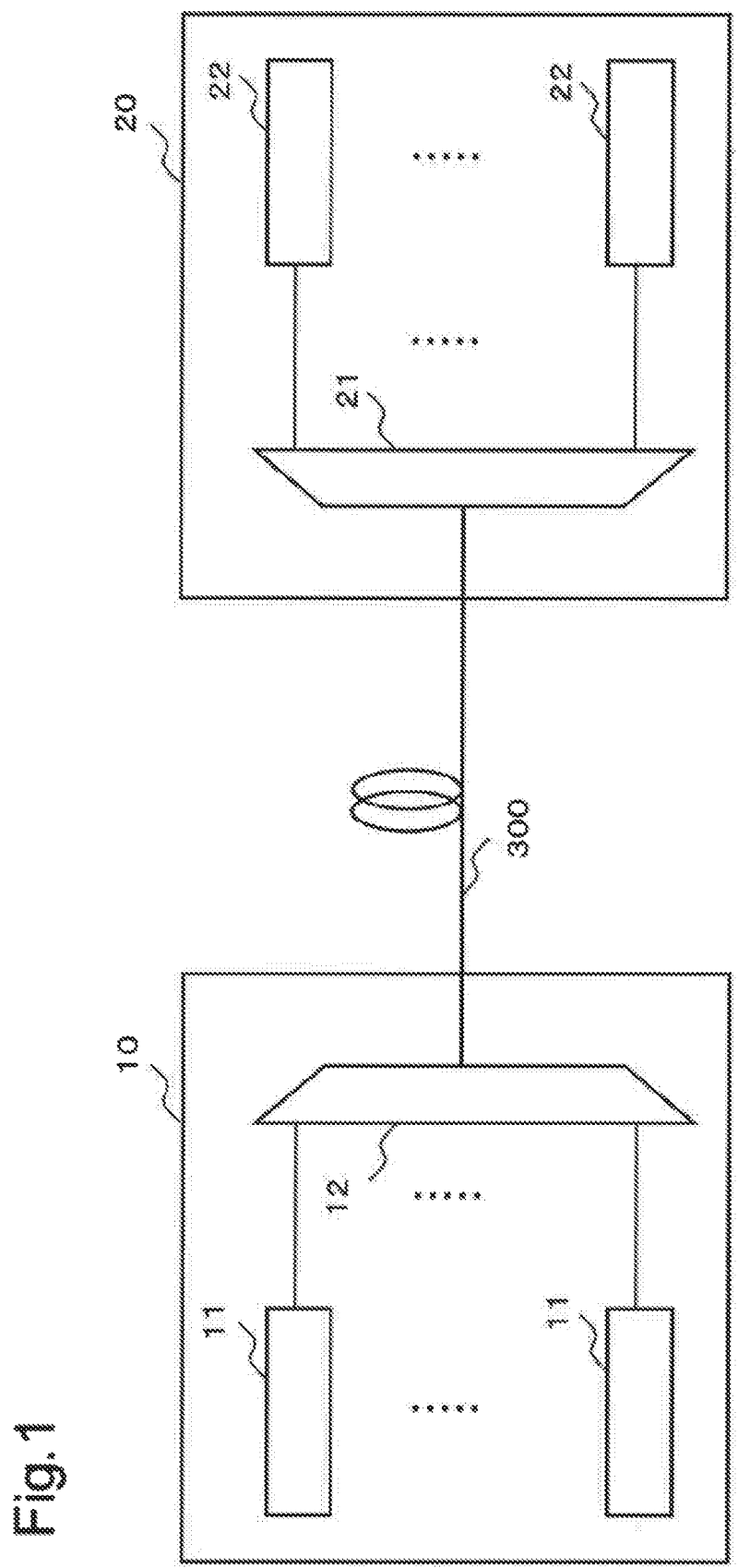
FIG. 1 is a diagram illustrating an outline of a configuration of a first example embodiment according to the present invention.

A first example embodiment of the present invention will be described in detail with reference to the drawings. FIG. 1 is a diagram illustrating an outline of a configuration of an optical communication system of the present example embodiment. The optical communication system of the present example embodiment includes a transmission device 10 and a reception device 20. The transmission device 10 and the reception device 20 are interconnected via a transmission line 300.

Figure 2:
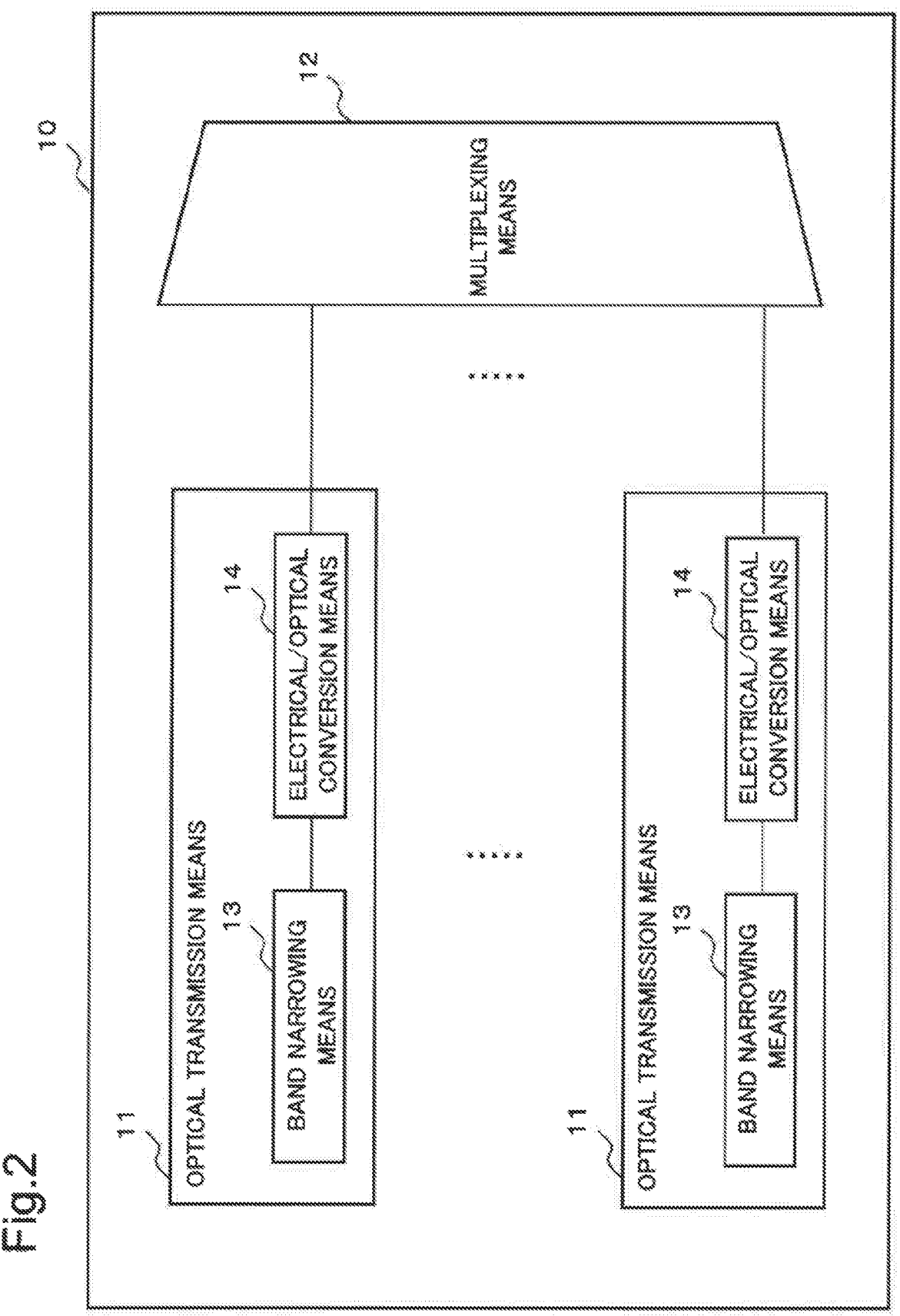
FIG. 2 is a diagram illustrating a configuration of a transmission device of the first example embodiment according to the present invention.

A configuration of the transmission device 10 will be described. FIG. 2 is a diagram illustrating the configuration of the transmission device 10 of the present example embodiment. The transmission device 10 of the present example embodiment includes a plurality of optical transmission means 11 and a multiplexing means 12. Each optical transmission means 11 further includes a band narrowing means 13 and an electrical/optical conversion means 14. Each band narrowing means 13 applies processing of performing spectral shaping that narrows bandwidth to less than or equal to a baud rate as band narrowing filter processing, based on a parameter shared in advance with the reception side. Each electrical/optical conversion means 14 generates an optical signal corresponding to a respectively assigned channel, based on a signal the bandwidth of which a band narrowing means 13 has narrowed to less than or equal to the baud rate. The multiplexing means 12 multiplexes optical signals of the respective channels output from the plurality of optical transmission means 11 into a multiplexed signal at spacings less than or equal to the baud rate and outputs the multiplexed signal. Each electrical/optical conversion means 14 includes a digital/analog conversion means that converts a digital signal having been subjected to the band narrowing filter processing in the digital domain to an analog electrical signal. The digital/analog conversion means is omitted in FIG. 2.

Figure 3:
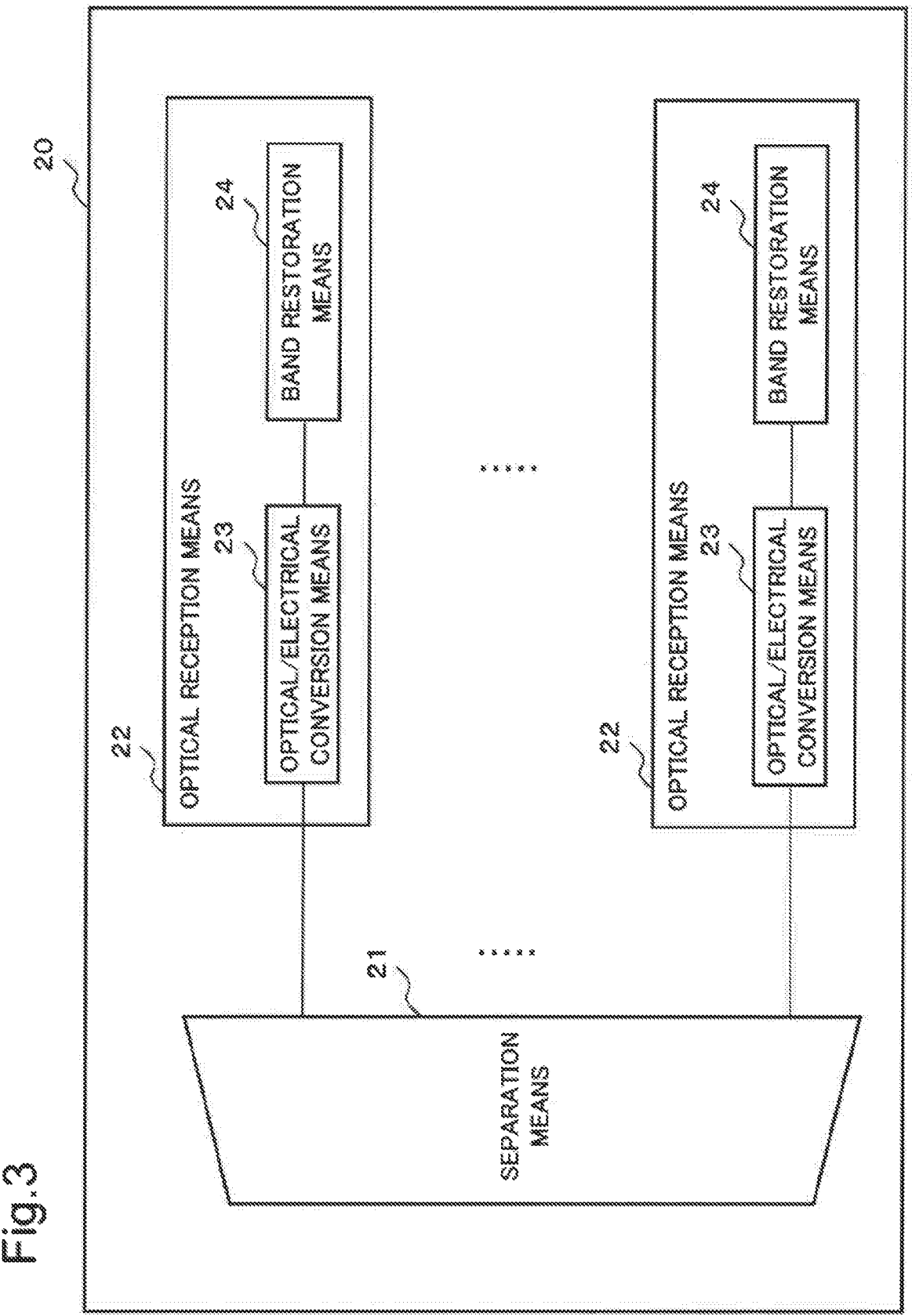
FIG. 3 is a diagram illustrating a configuration of a reception device of the first example embodiment according to the present invention.

A configuration of the reception device 20 will be described. FIG. 3 is a diagram illustrating the configuration of the reception device 20 of the present example embodiment. The reception device 20 of the present example embodiment includes a separation means 21 and a plurality of optical reception means 22. Each optical reception means 22 further includes an optical/electrical conversion means 23 and a band restoration means 24. The separation means 21 separates a multiplexed signal into which signals of the respective channels to which the spectral shaping, which narrows bandwidth to less than or equal to the baud rate, is applied as the band narrowing filter processing are multiplexed at spacings less than or equal to the baud rate on the transmission side into optical signals for the respective channels. Each optical/electrical conversion means 23 converts an optical signal of a respectively assigned channel to an electrical signal and outputs the electrical signal as a reception signal. Each band restoration means 24 applies processing having inverse characteristics to those of the band narrowing filter processing to a reception signal as band restoration filter processing, based on the parameter shared in advance with the transmission side and thereby restores the band of the reception signal. Each optical/electrical conversion means 23 includes an analog/digital conversion means that converts an analog signal that has been converted from an optical signal to an electrical signal to a digital signal. The analog/digital conversion means is omitted in FIG. 3.

The transmission device 10 of the present example embodiment performs processing of performing the spectral shaping, which narrows bandwidth of a signal to less than or equal to the baud rate, based on the parameter shared in advance with the reception side, in the band narrowing means 13. In addition, the transmission device 10 of the present example embodiment wavelength-division-multiplexes optical signals of the respective channels output from the plurality of optical transmission means 11 into a multiplexed signal at spacings less than or equal to the baud rate in the multiplexing means 12 and outputs the multiplexed signal. The transmission device 10 of the present example embodiment narrows bandwidth of signals to less than or equal to the baud rate, based on the parameter shared in advance with the reception side.

The reception device 20 of the present example embodiment separates a multiplexed signal into which signals of the respective channels are multiplexed at spacings less than or equal to the baud rate into optical signals for the respective channels in the separation means 21 and applies the band restoration filter processing having inverse characteristics to those of the band narrowing filter processing, which was applied on the transmission side, to the separated optical signals in the band restoration means 24. That is, since the band of a reception signal is restored in the band restoration means 24, based on the parameter shared in advance with the transmission side, it is possible to restore a signal spectrum closer to a transmission original signal before band narrowing. For this reason, the reception device 20 of the present example embodiment can perform processing on received signals in a stable manner. As a result, use of the reception device 20 of the present example embodiment enables stable communication to be performed in an optical communication system that wavelength-division-multiplexes subcarriers into a multiplexed signal at spacings less than or equal to a baud rate and transmits the multiplexed signal.

In the optical communication system of the present example embodiment, a multiplexed signal into which signals of the respective channels are multiplexed at spacings less than or equal to a baud rate is transmitted from the transmission device 10 to the reception device 20 via the transmission line 300. The optical communication system of the present example embodiment is, by performing communication using the transmission device 10 and the reception device 20, capable of performing stable communication when subcarriers are multiplexed at spacings less than or equal to the baud rate and transmitted.

Second Example Embodiment

Figure 4:
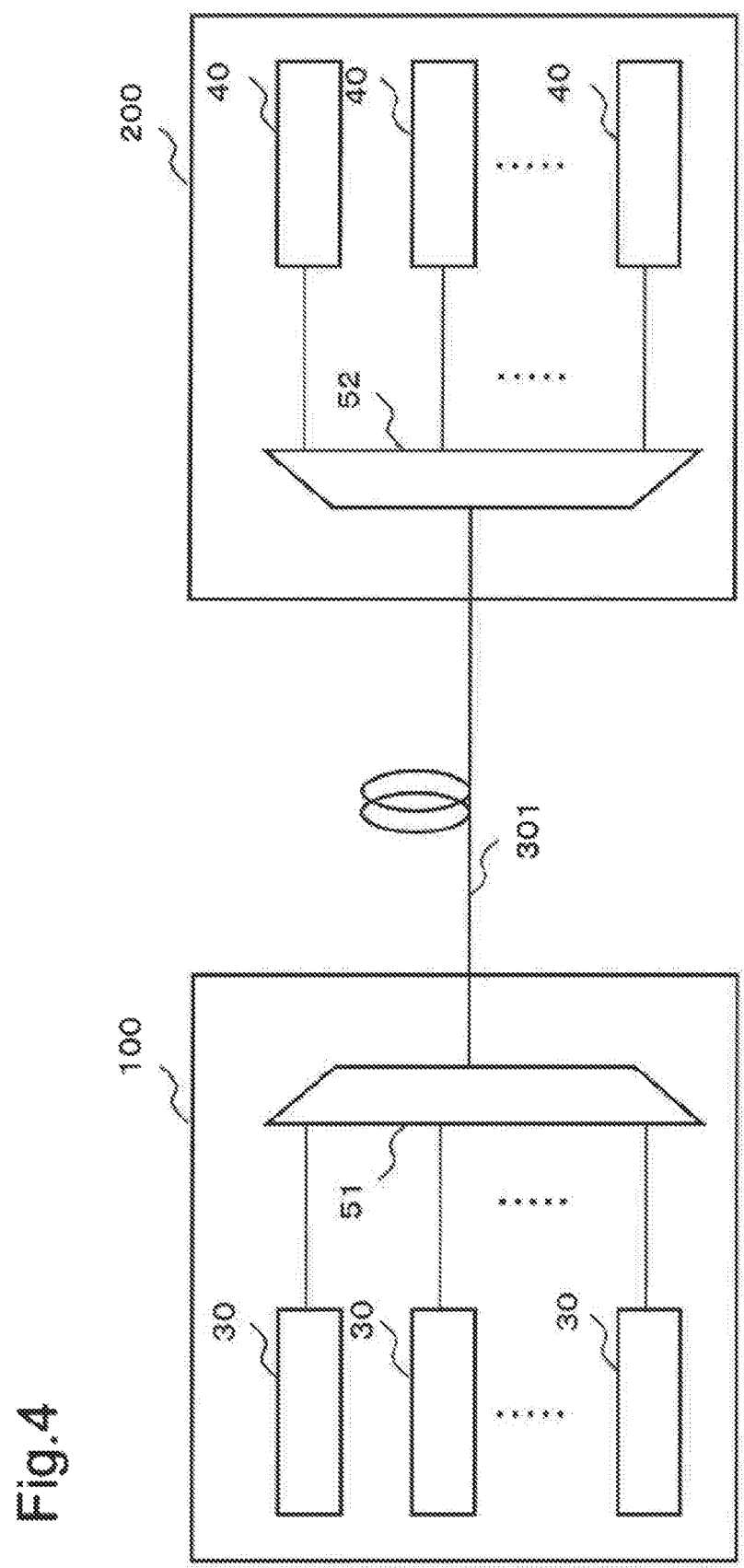
FIG. 4 is a diagram illustrating an outline of a configuration of a second example embodiment according to the present invention.

A second example embodiment of the present invention will be described in detail with reference to the drawings. FIG. 4 is a diagram illustrating an outline of a configuration of an optical communication system of the present example embodiment. The optical communication system of the present example embodiment includes a transmission device 100 and a reception device 200. The transmission device 100 and the reception device 200 are interconnected via an optical fiber transmission line 301.

The optical communication system of the present example embodiment is a digital optical communication system that transmits a wavelength-division-multiplexed optical signal from the transmission device 100 to the reception device 200 via the optical fiber transmission line 301. The optical communication system of the present example embodiment performs communication in a digital coherent method in which subcarriers are multiplexed. The communication system of the present example embodiment performs communication in a super-Nyquist transmission method in which subcarriers having bandwidth less than or equal to a baud rate are multiplexed at wavelength spacings less than or equal to the baud rate.

The transmission device 100 includes a plurality of optical transmitters 30 and a multiplexer 51. The transmission device 100 transmits a wavelength-division-multiplexed signal into which subcarriers that are generated by the respective optical transmitters 30, correspond to respective channels, and have bandwidth less than or equal to a baud rate are multiplexed at wavelength spacings less than or equal to the baud rate by the multiplexer 51 to the optical fiber transmission line 301.

Figure 5:
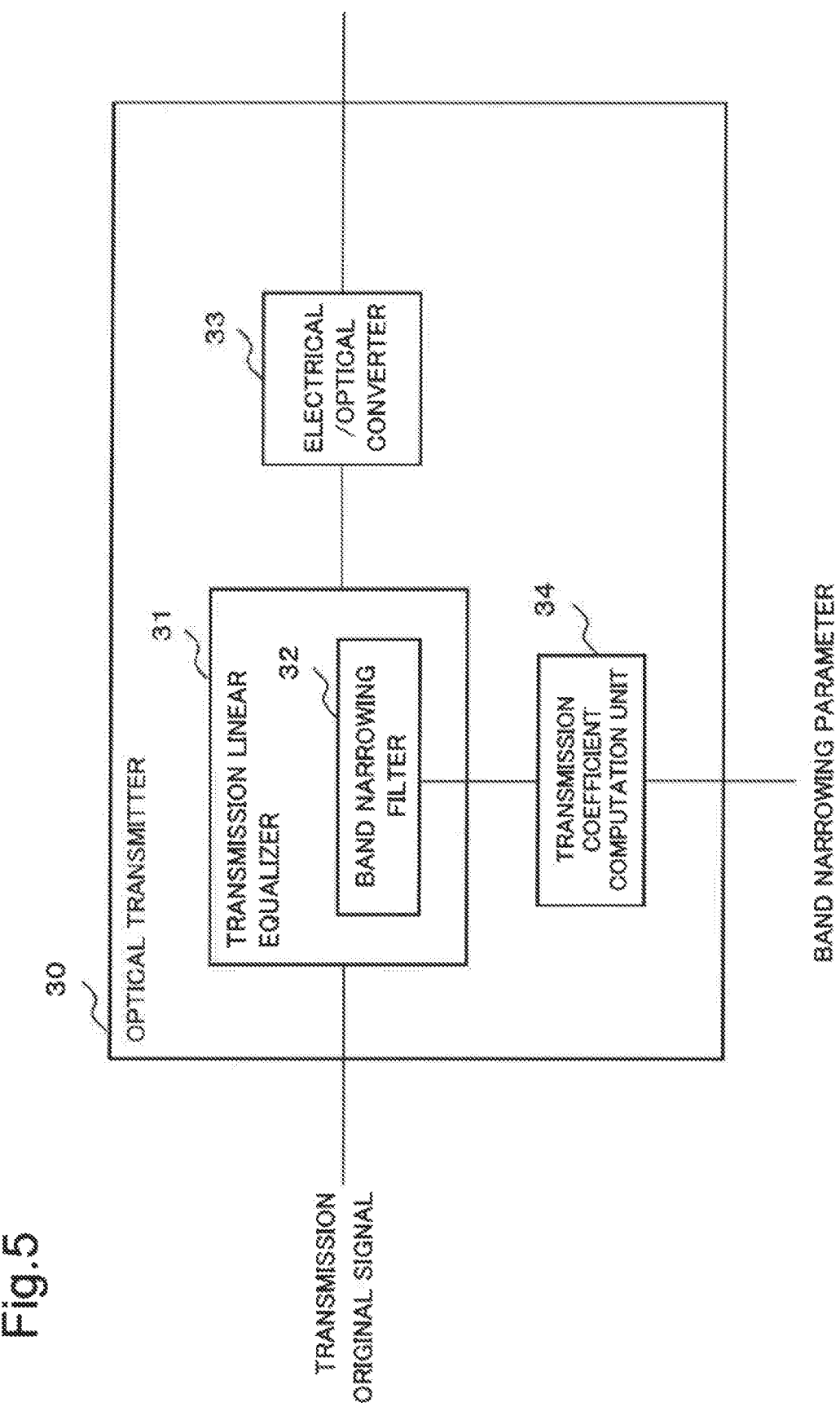
FIG. 5 is a diagram illustrating a configuration of an optical transmitter of the second example embodiment according to the present invention.

A configuration of each optical transmitter 30 will be described. FIG. 5 is a diagram illustrating the configuration of the optical transmitter 30 of the present example embodiment. The optical transmitter 30 includes a transmission linear equalizer 31, an electrical/optical converter 33, and a transmission coefficient computation unit 34. The transmission linear equalizer 31 further includes a band narrowing filter 32. The optical transmitter 30 of the present example embodiment is equivalent to the optical transmission means 11 of the first example embodiment.

The transmission linear equalizer 31 band-limits signal bandwidth of a transmission original signal to less than or equal to the baud rate, using the band narrowing filter 32. A filter shape when the band limitation is performed through application of filter processing to a transmission original signal, using the band narrowing filter 32 is input from the transmission coefficient computation unit 34. The transmission linear equalizer 31 and the band narrowing filter 32 of the present example embodiment are equivalent to the band narrowing means 13 of the first example embodiment.

The electrical/optical converter 33 converts an electrical signal input from the transmission linear equalizer 31 to an optical signal and outputs the optical signal. The electrical/optical converter 33 includes a light source and a modulator that modulates light output from the light source, based on an electrical signal input from the transmission linear equalizer 31. Wavelength of an optical signal that the electrical/optical converter 33 outputs is set based on an assigned channel and a wavelength design of the optical communication system. An optical signal output from the electrical/optical converter 33 is sent to the multiplexer 51 as a subcarrier. The electrical/optical converter 33 of the present example embodiment is equivalent to the electrical/optical conversion means 14 of the first example embodiment.

The transmission coefficient computation unit 34 sets a filter shape of the band narrowing filter 32, based on a band narrowing parameter input from the outside. The transmission coefficient computation unit 34 shares information of the band narrowing parameter with optical receivers 40 of the reception device 200.

The multiplexer 51 wavelength-division-multiplexes optical signals input from the respective optical transmitters 30 as subcarriers into a multiplexed signal and outputs the multiplexed signal to the optical fiber transmission line 301. For the multiplexer 51, for example, arrayed waveguide gratings (AWG) are used. The multiplexer 51 multiplexes subcarriers that are sent from the plurality of optical transmitters 30 and have wavelength spacings less than or equal to the baud rate therebetween into a multiplexed signal and outputs the multiplexed signal. The multiplexer 51 of the present example embodiment is equivalent to the multiplexing means 12 of the first example embodiment.

The reception device 200 includes a plurality of optical receivers 40 and a demultiplexer 52. The reception device 200 separates a multiplexed signal that is transmitted via the optical fiber transmission line 301 and into which subcarriers were multiplexed at wavelength spacings less than or equal to the baud rate into reception signals, using the demultiplexer 52 and performs processing on the reception signals, using the optical receivers 40 corresponding to the respective channels. Number of the optical transmitters 30 provided in the transmission device 100 and number of the optical receivers 40 provided in the reception device 200 correspond to the number of channels when communication is performed using the optical communication system.

Figure 6:
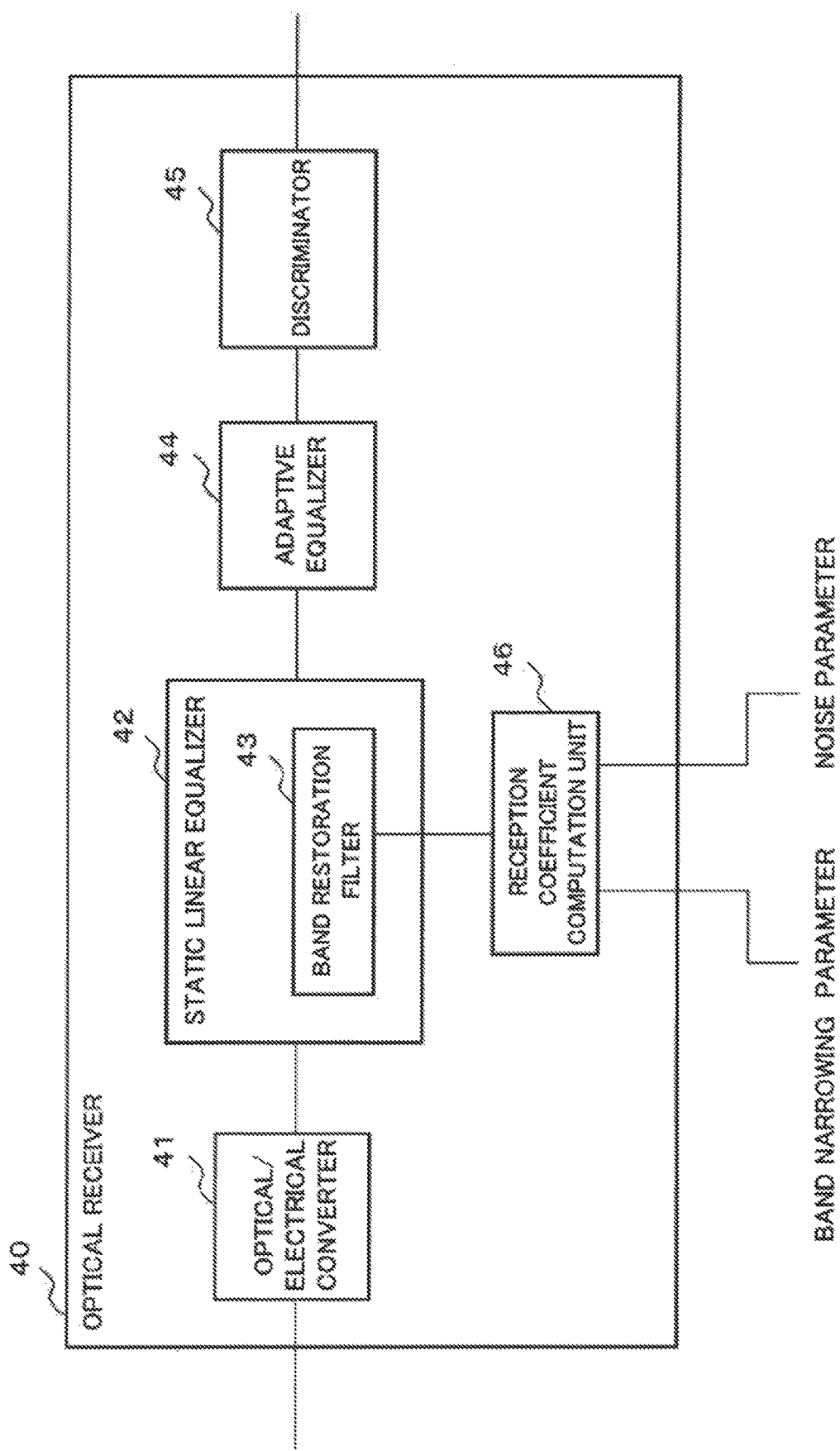
FIG. 6 is a diagram illustrating a configuration of an optical receiver of the second example embodiment according to the present invention.

A configuration of each optical receiver 40 will be described. FIG. 6 is a diagram illustrating the configuration of the optical receiver 40 of the present example embodiment. The optical receiver 40 includes an optical/electrical converter 41, a static linear equalizer 42, an adaptive equalizer 44, a discriminator 45, and a reception coefficient computation unit 46. The static linear equalizer 42 further includes a band restoration filter 43. The optical receiver 40 of the present example embodiment is equivalent to the optical reception means 22 of the first example embodiment.

The optical/electrical converter 41 converts an optical signal input from the demultiplexer 52 to an electrical signal. The optical/electrical converter 41 includes a light receiving element that converts an input optical signal to an electrical signal. The optical/electrical converter 41 sends a reception signal converted to an electrical signal to the static linear equalizer 42 as a digital signal. The optical/electrical converter 41 of the present example embodiment is equivalent to the optical/electrical conversion means 23 of the first example embodiment.

The static linear equalizer 42 has a function of restoring a band of a signal in addition to static waveform distortion compensation that is generally performed in the digital coherent method, such as wavelength dispersion compensation in which waveform distortion due to wavelength dispersion generated in the optical fiber transmission line 301 is compensated for. The static linear equalizer 42 performs filter processing having inverse characteristics to those of the band narrowing filter processing, which was applied on the transmission side, and thereby restores a band.

The static linear equalizer 42 performs filter processing having inverse characteristics to those of the band narrowing filter processing, which was applied on the transmission side, using the band restoration filter 43 and thereby restores a band of a reception signal. The band restoration filter 43 performs the restoration of a band, based on a minimum mean square error (MMSE) criterion. A filter shape used when the band restoration filter 43 applies the band restoration processing to a reception signal is input from the reception coefficient computation unit 46 as a filter coefficient. The reception signal that has been subjected to the band restoration processing in the band restoration filter 43 is sent to the adaptive equalizer 44. The static linear equalizer 42 and the band restoration filter 43 of the present example embodiment are equivalent to the band restoration means 24 of the first example embodiment.

The adaptive equalizer 44 applies adaptive equalization processing for achieving dynamic waveform shaping processing, which is generally performed in the digital coherent method, such as polarization separation and polarization mode dispersion compensation, to a reception signal sent from the band restoration filter 43 of the static linear equalizer 42. The adaptive equalizer 44 sends the reception signal to which the adaptive equalization processing has been applied to the discriminator 45.

The discriminator 45 discriminates a digital bit sequence represented by 1s and 0s from a reception signal input from the adaptive equalizer 44 and outputs the bit sequence signal.

The reception coefficient computation unit 46 computes a filter characteristic inverse to a band narrowing filter characteristic on the transmission side as a filter coefficient, based on the band narrowing parameter the information of which is shared with the transmission side and a noise parameter based on quality of reception signals. The reception coefficient computation unit 46 computes the filter characteristic inverse to the band narrowing filter characteristic on the transmission side, based on an MMSE criterion. Information of the band narrowing filter that is used when a band is limited on the transmission side is shared with a corresponding optical transmitter 30 in advance. The information of the band narrowing filter that is used when a band is limited on the transmission side is, for example, input to the reception coefficient computation unit 46 by a communication management system or an administrator.

The demultiplexer 52 separates a multiplexed signal input from the optical fiber transmission line 301 into respective subcarriers, that is, optical signals of the respective channels, and sends the subcarriers to the optical receivers 40 corresponding to the respective channels. For the demultiplexer 52, for example, arrayed waveguide gratings (AWG) are used. The demultiplexer 52 of the present example embodiment is equivalent to the separation means 21 of the first example embodiment.

The optical fiber transmission line 301 is constituted by optical fibers, optical amplifiers, and the like and transmits wavelength-division-multiplexed optical signals.

Operation of the optical communication system of the present example embodiment will be described. At the time of set-up or the like of the optical communication system upon commencement of operation thereof, information of the band narrowing parameter is set to the optical transmitters 30 and the optical receivers 40. The setting of the information of the band narrowing parameter is performed by the communication management system, an administrator, or the like. The band narrowing parameter is information indicating what filter processing is applied to a transmission original signal to narrow the band of the signal.

The information of the band narrowing parameter input to each optical transmitter 30 is sent to the transmission coefficient computation unit 34. When having received the information of the band narrowing parameter, the transmission coefficient computation unit 34 computes a filter coefficient used when the band narrowing filter 32 applies filter processing to a transmission original signal, based on the band narrowing parameter and characteristics of the transmission linear equalizer.

Figure 7:
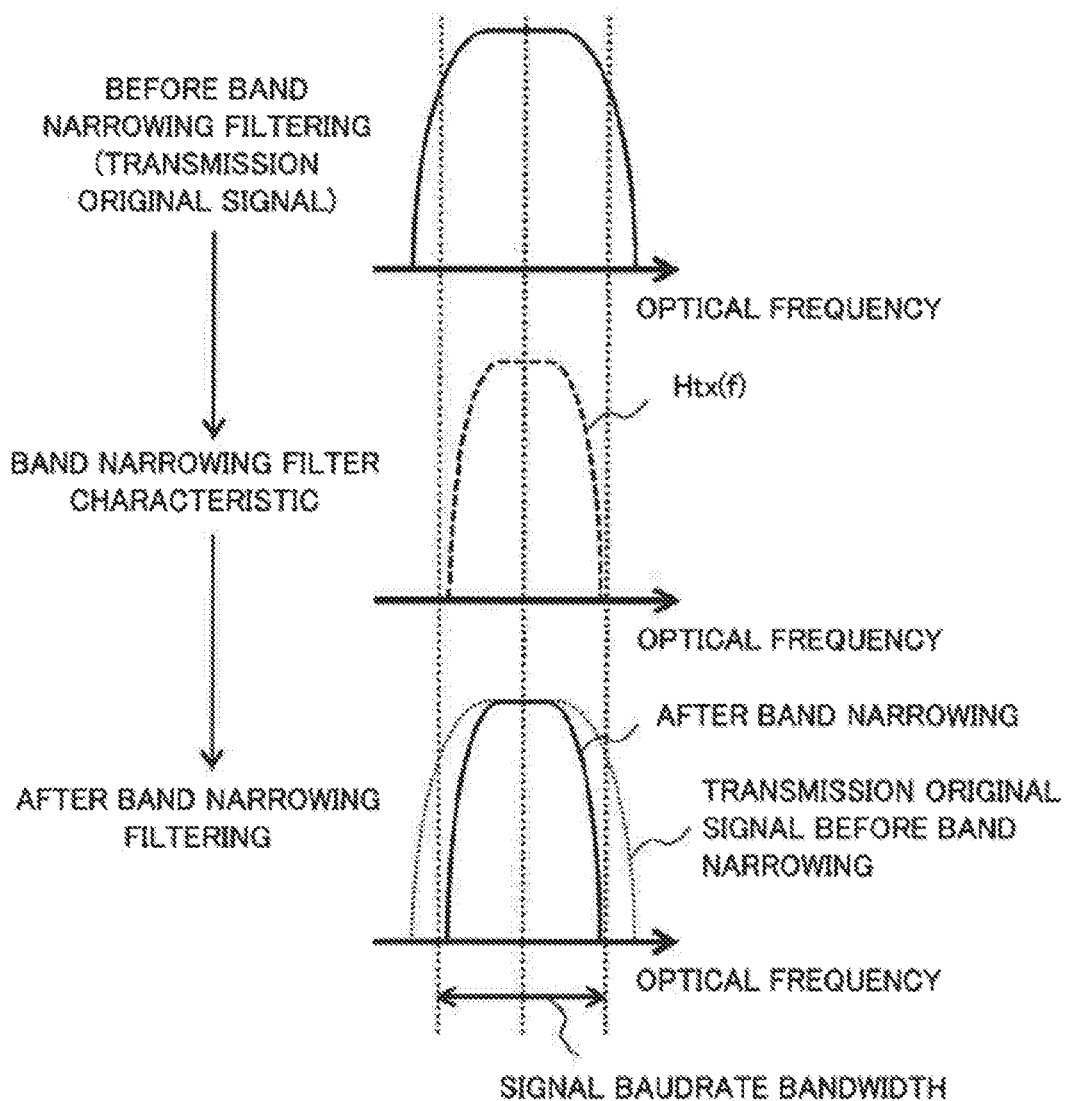
FIG. 7 is a diagram illustrating images of signal spectra of a transmission signal in the second example embodiment according to the present invention.

The band narrowing filter will be described. FIG. 7 illustrates images of spectral shapes when each band narrowing filter 32 shapes a signal spectrum. The top spectrum in FIG. 7 illustrates a spectral shape of a transmission original signal. The middle spectrum in FIG. 7 illustrates a filter characteristic of a band narrowing filter Htx(f). The bottom spectrum in FIG. 7 illustrates a shape of a signal spectrum after filter processing is applied by the band narrowing filter 32.

In the super-Nyquist method, further application of a band narrowing filter to a transmission original signal conforming to a Nyquist method generates a signal for transmission that is limited to a bandwidth less than or equal to the baud rate.

In the top spectrum in FIG. 7, although the spectral bandwidth of the transmission original signal is limited to a vicinity of the baud rate, signal components therein spread slightly wider than the baud rate. Although, in the case of the general Nyquist transmission method, signals having spectral shapes as illustrated in the top spectrum in FIG. 7 are multiplexed, wavelength-division-multiplexing at spacings less than or equal to the baud rate causes characteristics of the signals to severely deteriorate due to crosstalk with adjacent channels.

On the other hand, in the super-Nyquist method used in the present example embodiment, application of processing by the band narrowing filter Htx(f) illustrated in the middle spectrum in FIG. 7 to the transmission original signal causes the signal spectral bandwidth to be narrowed to less than or equal to the baud rate. Multiplexing of signals to which the processing by the band narrowing filter Htx(f) is applied and that have signal spectral bandwidth illustrated in the bottom spectrum in FIG. 7 enables wavelength division multiplexing of the signals at spacings less than or equal to the baud rate without causing characteristic deterioration due to crosstalk. Although there is a possibility that application of the processing by the band narrowing filter causes inter-symbol interference and thereby causes signal quality deterioration, compensation on the reception side can suppress influence from the inter-symbol interference. Thus, use of the super-Nyquist method, in which transmission of a multiplexed signal multiplexed at wavelength-division-multiplexing spacings less than or equal to the baud rate through band narrowing is performed, enables frequency usage efficiency to be improved.

Figure 8:
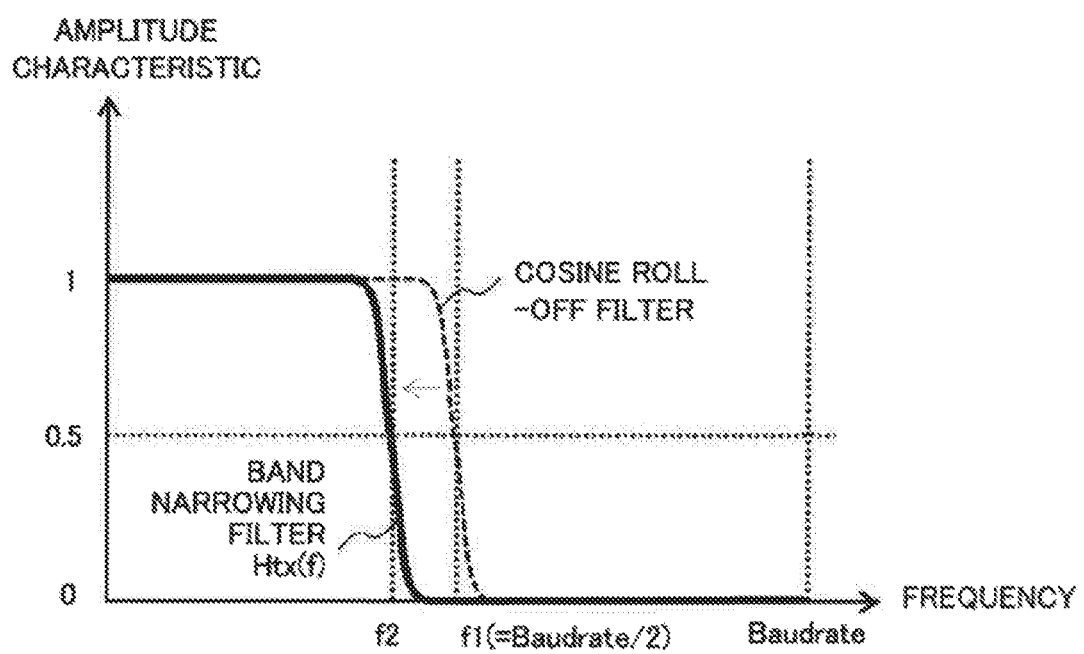
FIG. 8 is a diagram illustrating an example of a band narrowing filter characteristic in the second example embodiment according to the present invention.

FIG. 8 illustrates an example of the band narrowing filter Htx(f). FIG. 8 illustrates a filter characteristic for a baseband signal. That is, FIG. 8 illustrates, of the filter characteristic for an optical spectrum illustrated in the middle spectrum in FIG. 7, only a half on one side when the carrier frequency is assumed to be 0. The band narrowing filter Htx(f) illustrated in FIG. 8 has a characteristic that is obtained by shifting the roll-off characteristic of a cosine roll-off filter used as a Nyquist filter to the low frequency side as it is. In a regular cosine roll-off filter, the amplitude characteristic becomes 0.5, that is, a half, at a frequency f1 of a half of the baud rate. Meanwhile, in the band narrowing filter Htx(f) in FIG. 8, a frequency f2 at which the amplitude characteristic becomes 0.5 is parallel-shifted to the low frequency side. When a ratio f2/f1 is assumed to be a band narrowing parameter, the smaller is the band narrowing parameter, the narrower the signal spectral bandwidth becomes. For example, when the band narrowing parameter is 0.9, the bandwidth is narrowed by 10% compared with the regular Nyquist method.

Although, in FIG. 8, an example of a band narrowing filter based on the cosine roll-off characteristics is illustrated, any other band narrowing filter may be used as long as the filter is based on a characteristic that narrows a signal band.

When a signal to be transmitted via the optical fiber transmission line 301 has been input to one of the optical transmitters 30 as a transmission original signal, the transmission original signal is sent to the transmission linear equalizer 31. When the transmission original signal has been input to the transmission linear equalizer 31, the band narrowing filter 32 applies the band narrowing filter processing to the transmission original signal. The band narrowing filter 32 applies the filter processing to the transmission original signal, based on the filter coefficient received from the transmission coefficient computation unit 34.

The band narrowing filter 32 sends the signal to which the filter processing has been applied to the electrical/optical converter 33. When having received the signal, the electrical/optical converter 33 generates an optical signal, based on the received signal. The electrical/optical converter 33 sends the generated optical signal to the multiplexer 51.

When optical signals have been input from the respective optical transmitters 30 as subcarriers of the respective channels, the multiplexer 51 wavelength-division-multiplexes the optical signals, that is, subcarriers, from the respective optical transmitters 30. The multiplexer 51 wavelength-division-multiplexes the subcarriers sent from the respective optical transmitters 30 into a multiplexed signal at wavelength spacings less than or equal to the baud rate and transmits the multiplexed signal to the optical fiber transmission line 301. The multiplexed signal transmitted from the multiplexer 51 of the transmission device 100 is transmitted through the optical fiber transmission line 301 and thereby sent to the reception device 200.

The multiplexed signal transmitted through the optical fiber transmission line 301 is input to the demultiplexer 52 of the reception device 200. The demultiplexer 52 separates the input multiplexed signal into optical signals corresponding to the respective channels and sends the optical signals to the corresponding optical receivers 40. The optical signals sent to the corresponding optical receivers 40 are input to the optical/electrical converters 41.

Each optical/electrical converter 41 converts the input optical signal, that is, a reception signal, to an electrical signal and sends the electrical signal to the static linear equalizer 42 as a digital signal.

When the reception signal has been input, the static linear equalizer 42 applies filter processing to the reception signal, using the band restoration filter 43 and thereby restores the band of the reception signal on which the band narrowing was performed on the transmission side. The band restoration filter has a characteristic inverse to that of the band narrowing filter on the transmission side. The filter coefficient of the band restoration filter is determined through computation processing by the reception coefficient computation unit 46 and input to the band restoration filter 43 from the reception coefficient computation unit 46.

The reception coefficient computation unit 46 generates data indicating a shape of the band restoration filter, based on the band narrowing parameter, which is input by the communication management system or an administrator, and a noise parameter indicating noise in the optical fiber transmission line 301.

Figure 9:
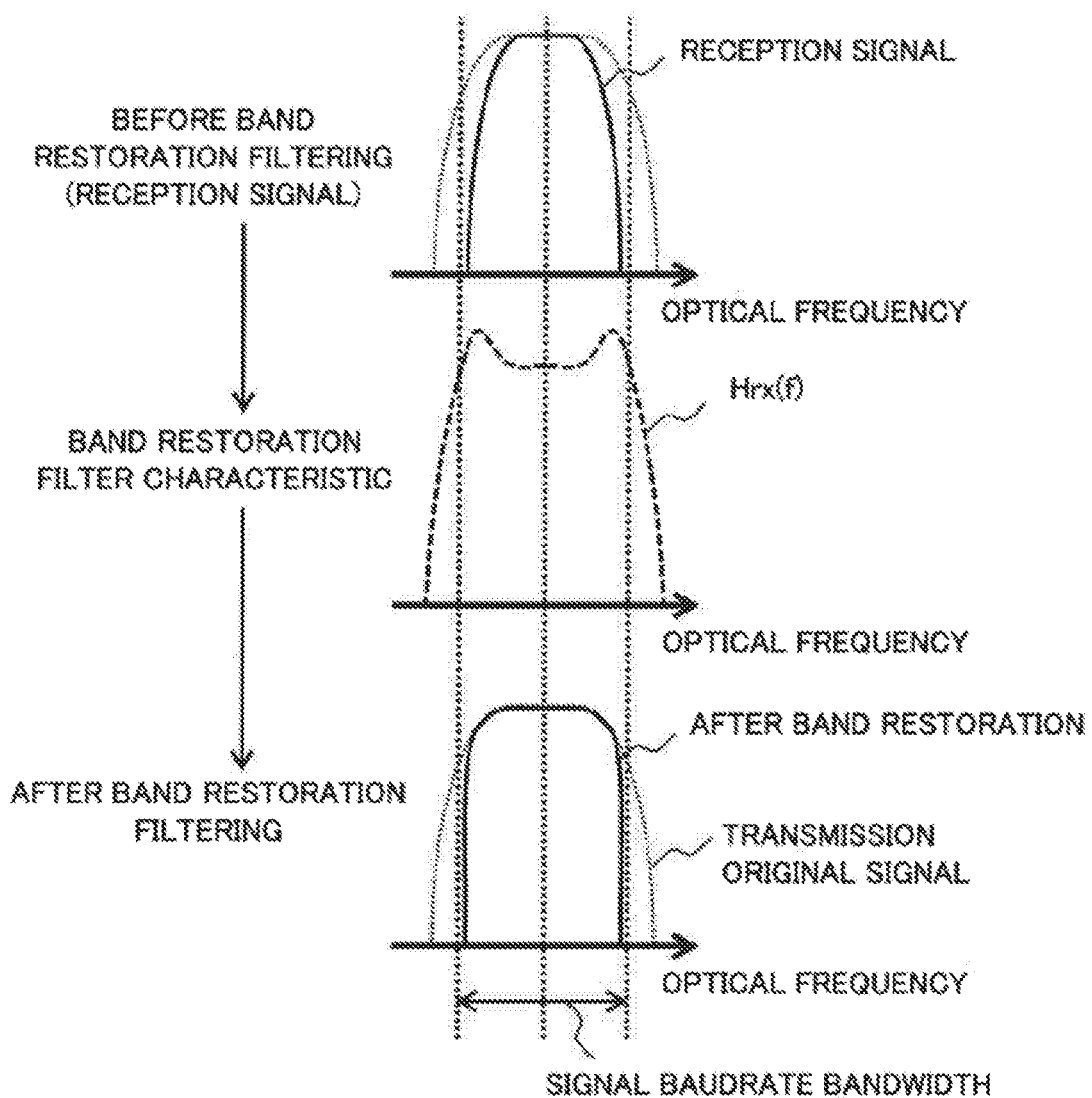
FIG. 9 is a diagram illustrating images of signal spectra of a reception signal in the second example embodiment according to the present invention.

The band restoration filter processing will be described. FIG. 9 illustrates images of spectral shapes when a reception signal is processed. The top spectrum in FIG. 9 illustrates a spectral shape of a reception signal. The middle spectrum in FIG. 9 illustrates a filter shape of a band restoration filter Hrx(f). The bottom spectrum in FIG. 9 illustrates a spectral shape of a signal after band restoration. As illustrated in the top spectrum in FIG. 9, since having been subjected to the band narrowing filter on the transmission side, the reception signal before band restoration has a spectral shape in which, among signal principal components contained within the baud rate bandwidth, in particular, high frequency components are substantially attenuated, causing the waveform thereof to be substantially distorted.

If a signal having a substantial waveform distortion as illustrated in the top spectrum in FIG. 9 is input to the adaptive equalizer at the succeeding stage, there is a possibility that the convergence of the adaptive equalization algorithm is severely impaired and the stability thereof is lost. In some cases, there is a possibility that the adaptive equalization algorithm diverges, instead of converging, caused by the distorted waveform and loss of synchronization occurs. Such a situation may become a fatal problem for an optical communication system.

In the optical communication system of the present example embodiment, performing the band restoration filter processing having characteristics inverse to those of the band narrowing filter processing, performed on the transmission side, causes high frequency components to be lifted up, as illustrated in the bottom spectrum in FIG. 9. Thus, it is possible to bring the signal spectrum closer to the spectrum of the transmission original signal by the band restoration filter processing. Since the lifting up of high frequency components enables waveform distortion to be suppressed, the convergence of the adaptive equalizer at the succeeding stage is improved. Therefore, in the optical communication system of the present example embodiment, it is possible to maintain a stable communication state without loss of synchronization.

As illustrated in the bottom spectrum in FIG. 9, since it is impossible to completely restore a signal a portion of which was once lost on the transmission side to the original signal, a small amount of waveform distortion is left unremoved and characteristic deterioration occurs in the signal after the band restoration filter processing. However, when the amount of characteristics deterioration is less than an error correction limit, it is possible to continue communication normally. Therefore, in the optical communication system of the present example embodiment, it becomes possible to, while improving frequency usage efficiency, continue normal communication even without using a maximum likelihood sequence estimation (MLSE) equalizer, which has a large circuit size and consumes a lot of power.

An example of the band restoration filter Hrx(f) will be described. When the band narrowing is performed by removing high frequency components on the transmission side, processing of amplifying high frequency components may be performed on the reception side as processing having inverse characteristics to those of the band narrowing. However, since noise components have been superimposed on a reception signal after transmission, amplification of high frequency components amplifies not only signal components but also noise components, which causes a signal-to-noise ratio to deteriorate and deterioration in reception characteristics to occur. Therefore, it is required to apply appropriate filtering processing in such a way that attenuated signal components are amplified with noise components taken into consideration. As a filter that has an appropriate characteristic enabling attenuated signal components to be amplified with noise components taken into consideration, for example, a band restoration filter Hrx(f) that has a filter characteristic based on an MMSE criterion expressed by the mathematical expression 1 below can be used. Application of filter processing using the band restoration filter Hrx(f) expressed by the mathematical expression 1 enables appropriate compensation of signal components without excessive amplification of high frequency noise components.

$$Hrx(f) = \frac{Htx(f)}{|Htx(f)|^2 + \gamma} \quad \text{[Math 1]}$$

Htx(f) in the above-described mathematical expression 1 denotes a characteristic of a band narrowing filter that is applied on the transmission side. In addition, γ denotes a noise parameter. As expressed in the mathematical expression 1, an appropriate value determined by, for example, sweeping the noise parameter γ at the time of starting-up of the optical communication system can be used as a setting value of the noise parameter γ. Characteristic data of the band narrowing filter Htx(f), which is used when band narrowing is performed on the transmission side, are input to the reception coefficient computation unit 46 by the communication management system or the administrator. Regarding the data of the band narrowing filter Htx(f) on the transmission side, information of the band narrowing parameter used by the optical transmitters 30 is input to the reception coefficient computation unit 46 by the communication management system or the administrator and shared in advance.

The reception coefficient computation unit 46 generates data of a filter shape based on the mathematical expression 1 from the band narrowing parameter and the noise parameter γ and sends the generated data to the band restoration filter 43 as a filter coefficient. The band restoration filter 43 applies band restoration filter processing as illustrated in FIG. 9 to a reception signal, based on the filter coefficient received from the transmission coefficient computation unit 46. The band restoration filter 43 sends the reception signal that has been subjected to the band restoration filter processing to the adaptive equalizer 44.

When the signal that has been subjected to the band restoration filter processing has been input, the adaptive equalizer 44 performs adaptive equalization processing on the input signal and sends the processed signal to the discriminator 45. When having received the signal from the adaptive equalizer 44, the discriminator 45 performs discrimination on the reception signal as a digital bit sequence and outputs a signal based on the discriminated bit sequence. The optical/electrical converter 41, the static linear equalizer 42, the band restoration filter 43, the adaptive equalizer 44, and the discriminator 45 repeat the above-described operations every time a reception signal is input.

Figure 10:
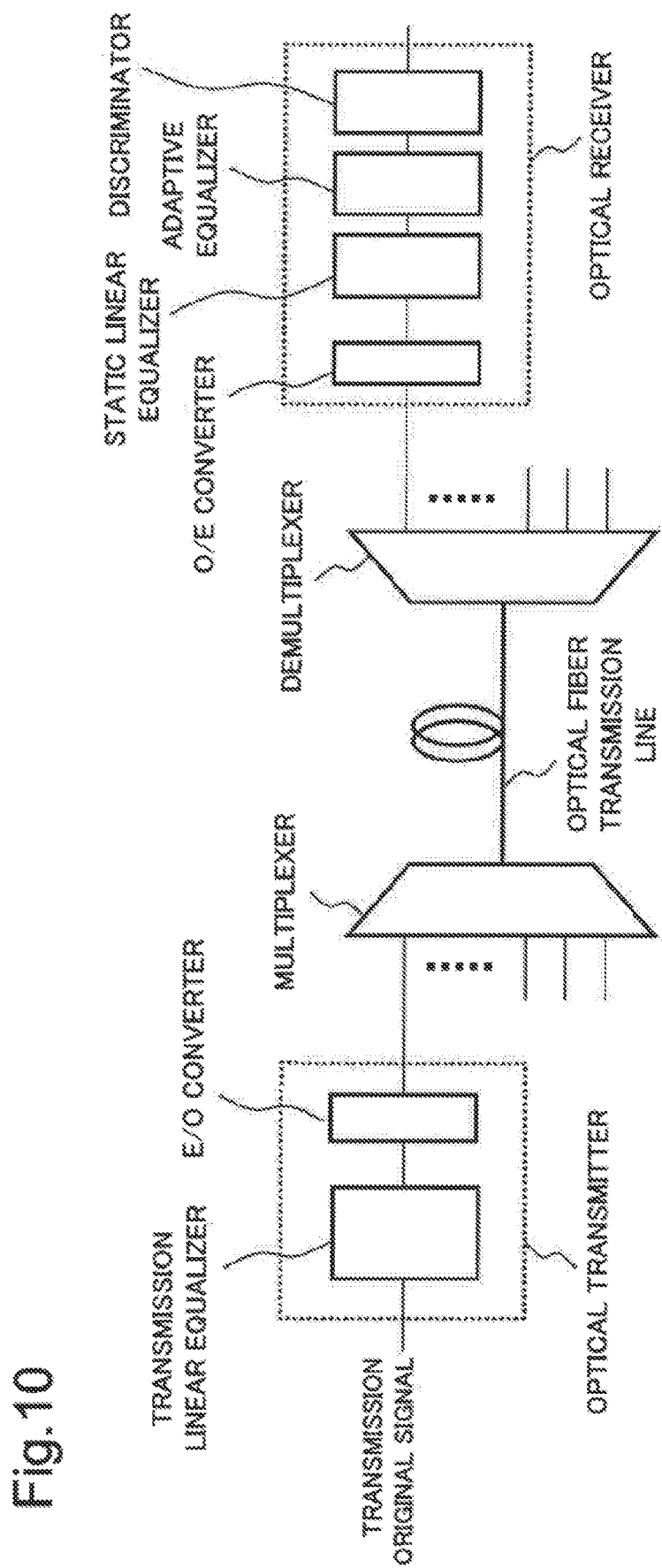
FIG. 10 is a diagram illustrating an example of a configuration of an optical communication system having a configuration for comparison with the present invention.
Figure 11A:
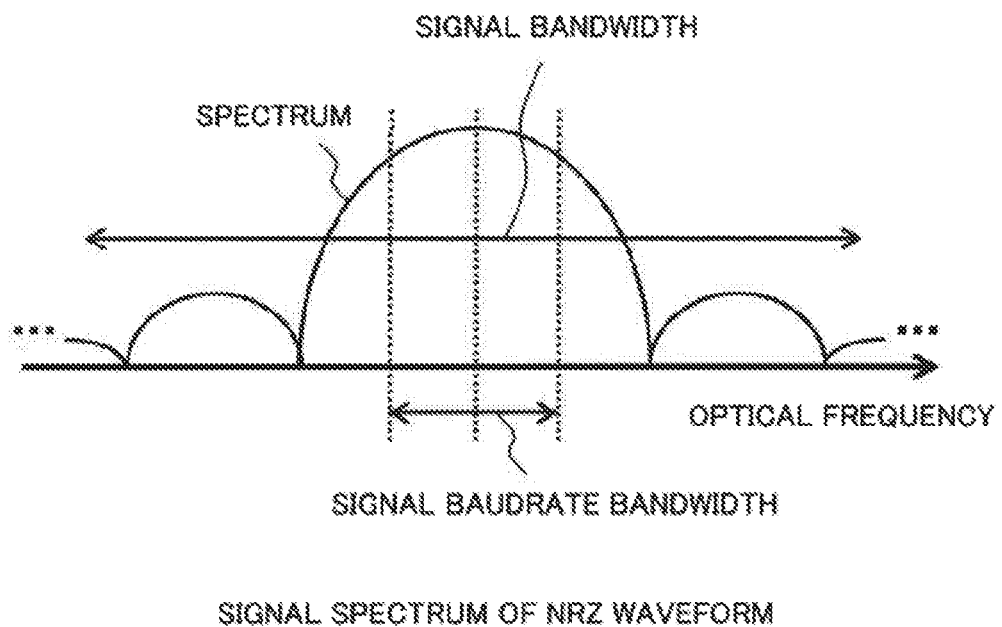
FIG. 11A is a diagram illustrating an example of a signal spectrum of an NRZ waveform.
Figure 11B:
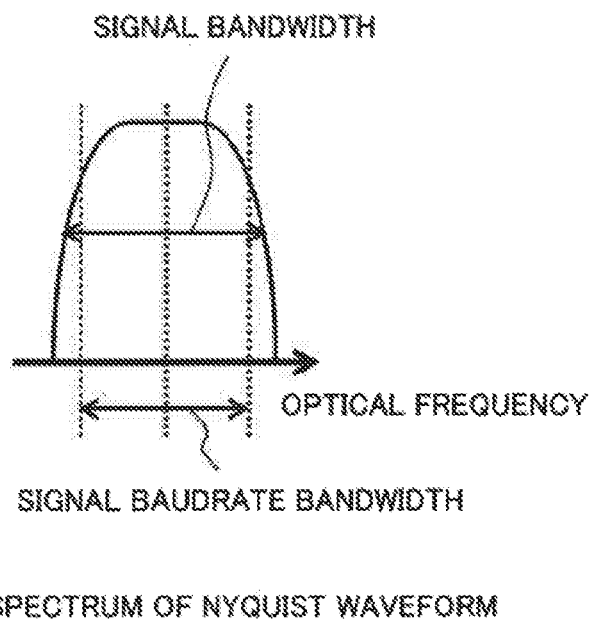
FIG. 11B is a diagram illustrating an example of a signal spectrum of a Nyquist waveform.
Figure 11C:
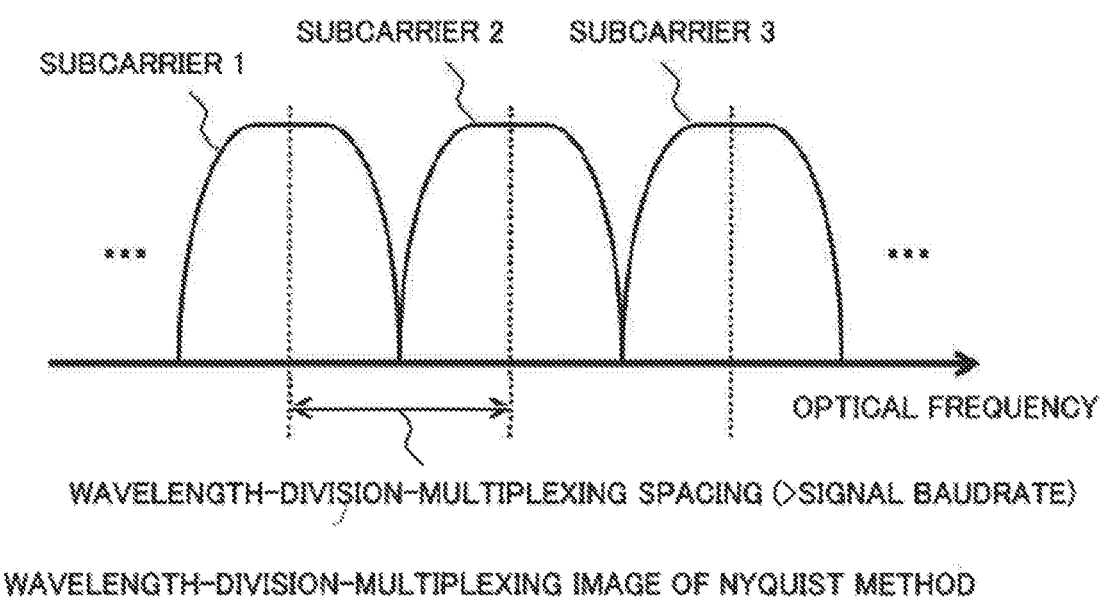
FIG. 11C is a diagram illustrating an image of wavelength division multiplexing in a Nyquist method.

FIG. 10 is a diagram illustrating a configuration of an optical communication system using the Nyquist transmission method as an example for comparison with the optical communication system of the present example embodiment. An E/O converter in FIG. 10 is equivalent to the electrical/optical converter of the present example embodiment. An O/E converter in FIG. 10 is equivalent to the optical/electrical converter of the present example embodiment. FIG. 11A illustrates a signal spectrum in a non return to zero (NRZ) method. FIG. 11B illustrates a signal spectrum in the Nyquist transmission method. FIG. 11C illustrates a spectral image of wavelength-division-multiplexed subcarriers in the Nyquist transmission method.

In the Nyquist transmission method, a transmission linear equalizer on the transmission side and a static linear equalizer on the reception side apply root-Nyquist filters based on cosine roll-off filters. The cosine roll off filter is used as a band limiting filter satisfying the Nyquist's first criterion. In the Nyquist transmission method, performing such processing enables a signal band to be narrowed to a vicinity of a baud rate in a state in which there is no inter-symbol interference (ISI). Thus, in the Nyquist transmission method, it becomes possible to substantially narrow the bandwidth compared with a signal spectrum in the NRZ method. As a result, in the Nyquist transmission method, it becomes possible to perform high density wavelength division multiplexing, as illustrated in FIG. 11C.

Since, in FIG. 11C, a case where subcarriers are multiplexed at narrowest wavelength-division-multiplexing spacings that do not cause crosstalk with adjacent subcarrier signals is illustrated, the wavelength-division-multiplexing spacing becomes slightly wider than the signal baud rate. Regarding a cosine roll off filter, when a roll-off factor is brought close to 0 to the extent possible, it becomes possible to bring the signal spectral shape closer to a rectangle, and it thereby becomes possible to achieve wavelength division multiplexing at spacings as close to the baud rate as possible. However, to generate an ideal transmission signal having a roll-off factor of 0 using an actual device, requirements for analog characteristics of transmission front-end devices, such as an optical modulator and its driver circuit constituting the E/O converter, become extremely hard to achieve. The analog characteristics include characteristics such as a frequency response, in-band flatness, and reflection. In addition, bringing the wavelength-division-multiplexing spacings to less than or equal to the baud rate causes the characteristics to substantially deteriorate due to influence of crosstalk.

Figure 12:
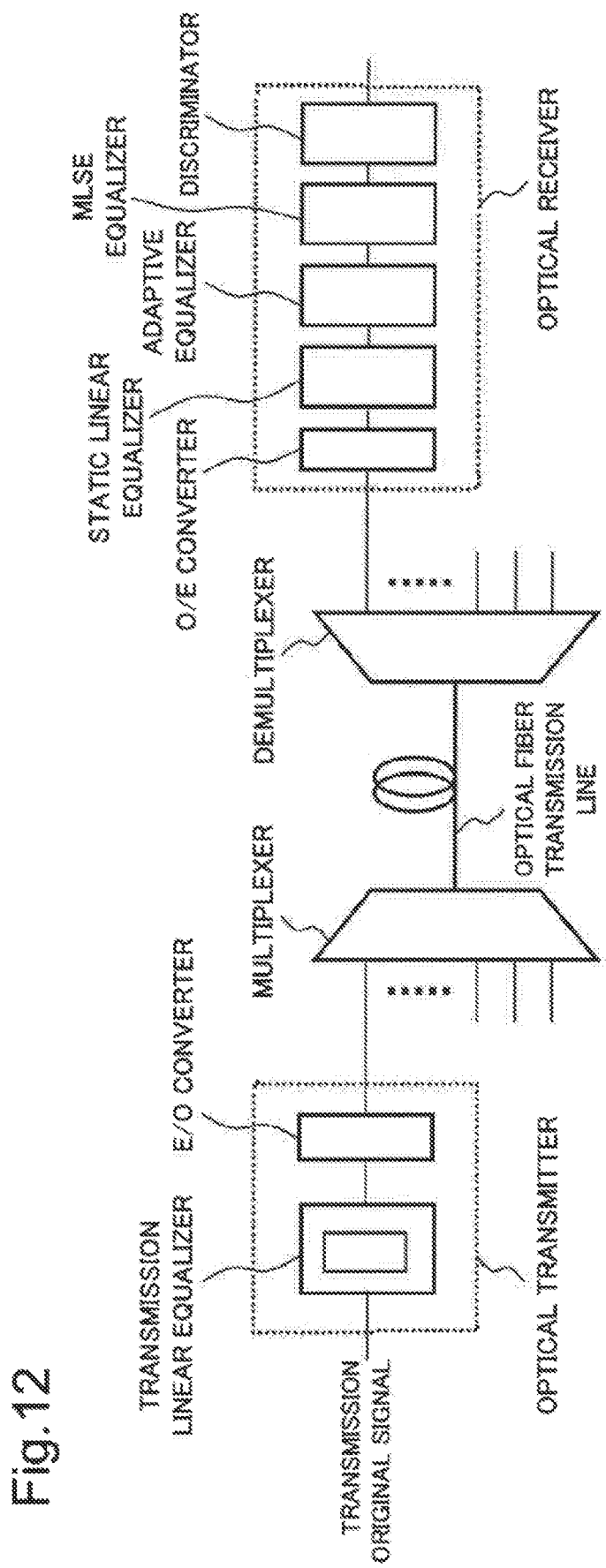
FIG. 12 is a diagram illustrating an example of a configuration of another optical communication system having a configuration for comparison with the present invention.

FIG. 12 is a diagram illustrating an example of a configuration of a regular super-Nyquist transmission method, which performs wavelength division multiplexing at wavelength-division-multiplexing spacings less than or equal to a baud rate without performing band narrowing processing and band restoration processing in accordance with the method of the present example embodiment. In the super-Nyquist transmission method as illustrated in FIG. 12, band narrowing filter processing that narrows signal bandwidth to less than a baud rate is applied in a transmission linear equalizer, and high-density wavelength-division-multiplexing spacings that are less than or equal to the baud rate are achieved.

Figure 13A:
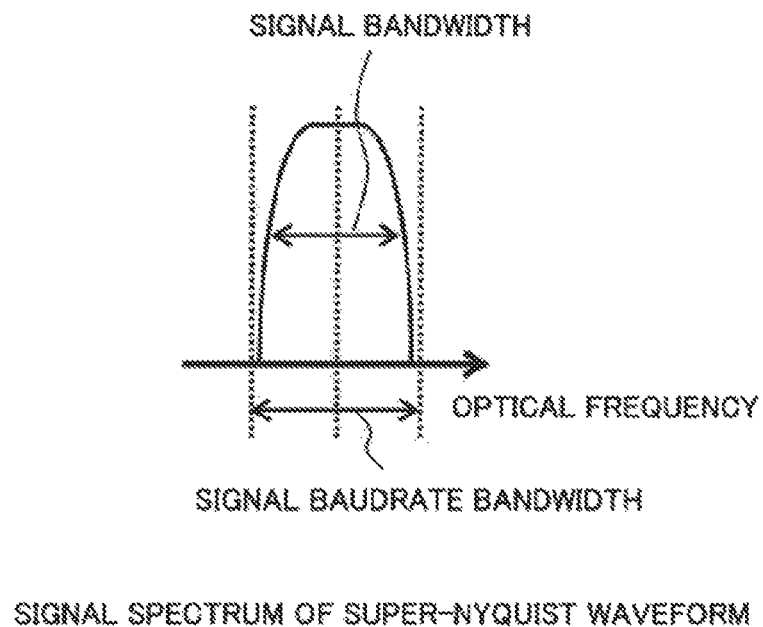
FIG. 13A is a diagram illustrating an example of a signal spectrum of a super-Nyquist waveform.
Figure 13B:
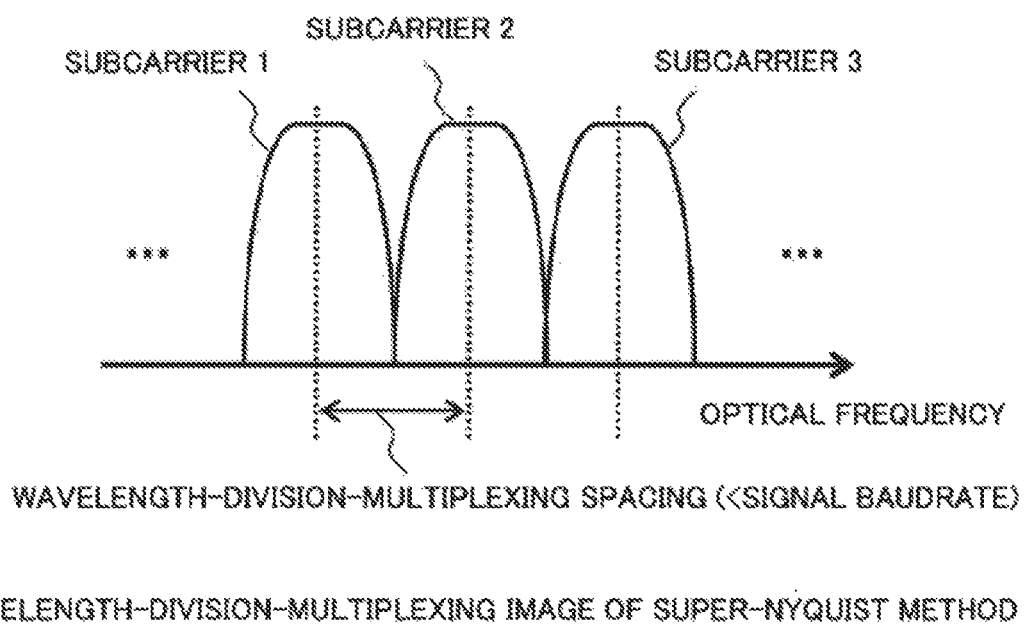
FIG. 13B is a diagram illustrating an image of wavelength division multiplexing of super-Nyquist waveforms.

FIG. 13A illustrates a signal spectrum image in the super-Nyquist method. FIG. 13B illustrates a spectral image of wavelength-division-multiplexed subcarriers in the super-Nyquist method. In the super-Nyquist method, it becomes possible to perform wavelength division multiplexing at spacings less than or equal to a baud rate and thereby becomes possible to improve frequency usage efficiency, as illustrated in FIGS. 13A and 13B. However, in the super-Nyquist method, since the amount of information is reduced by cutting transmission signal bandwidth down to less than or equal to the baud rate, it is difficult to restore a transmission signal by means of regular reception processing. For this reason, as illustrated in FIG. 12, a method of restoring transmission symbols on the reception side, using a maximum likelihood estimation algorithm typified by a maximum likelihood sequence estimation (MLSE) equalizer is sometimes used.

However, there are mainly two major problems in the super-Nyquist transmission method described above. The first problem is stability in waveform equalization. In the optical receiver, two types of waveform equalization processing, that is, a static linear equalizer for compensating for static waveform distortion, such as wavelength dispersion compensation, and an adaptive equalizer for compensating for waveform distortion that temporally varies, including polarization processing, are performed. However, in the super-Nyquist transmission method, signals having bandwidth narrower than the band of transmission original signals are received. Thus, although it is required to restore the original signal on the reception side, the narrower signal bandwidth is made in order to narrow wavelength-division-multiplexing spacings and thereby improve frequency usage efficiency, the larger waveform distortion of a reception signal becomes, which causes convergence of the adaptive equalizer to severely deteriorate. In some cases, there is a possibility that loss of synchronization occurs, and it becomes unable to perform stable communication.

The second problem is that the signal restoration processing using a maximum likelihood estimation algorithm is so complex that increase in circuit size and power consumption occurs. In particular, implementing an MLSE equalizer used at a throughput of more than or equal to 100 Gbps, which is applied in optical communication, as an LSI not only has a high degree of technical difficulty but also is not practical from the viewpoint of circuit size thereof even when the current state-of-the-art process is used.

On the other hand, the optical communication system of the present example embodiment is capable of reducing distortion of a reception signal by applying, on the reception side, the band restoration filter processing that has inverse characteristics to those of the band narrowing filter, which is applied on the transmission side to make the band of transmission original signals less than or equal to the baud rate. Therefore, convergence of the adaptive equalization processing in the adaptive equalizer at the succeeding stage is stabilized and it becomes possible to continue stable communication.

The optical communication system of the present example embodiment applies the band narrowing filter processing to transmission original signals, based on the band narrowing parameter shared in advance between the transmission side and the reception side and converts the filtered signals to optical signals corresponding to subcarriers of the respective channels, in the optical transmitters 30. The subcarriers output from the respective optical transmitters 30 are multiplexed into a multiplexed signal at wavelength spacings less than or equal to the baud rate by the multiplexer 51, and the multiplexed signal is transmitted via the optical fiber transmission line 301. Thus, in the optical communication system of the present example embodiment, it is possible to improve frequency usage efficiency. On the reception side, the multiplexed signal is separated into optical signals of the respective channels by the demultiplexer 52, and the optical signals are converted to electrical signals by the optical/electrical converters 41, after which the band restoration processing is applied to the electrical signals by the band restoration filters, which have inverse characteristics to those of the band narrowing filters.

In the optical communication system of the present example embodiment, application of filter processing having an inverse characteristic to that of the band narrowing parameter, shared in advance with the transmission side, in each optical receiver 40 enables signal spectra that are closer to the signal spectra of transmission original signals before band narrowing to be restored. For this reason, influence from distortion of a signal can be suppressed, and it is thereby possible to stably perform processing of reception signals in the adaptive equalizer or the like. Therefore, signals can be restored stably even without using an MLSE equalizer or the like, which causes increase in circuit size and power consumption, and circuit miniaturization and power consumption reduction can thereby be achieved. Consequently, the optical communication system of the present example embodiment enables a plurality of subcarrier signals to be multiplexed at spacings less than or equal to the baud rate and, while thereby enabling frequency usage efficiency to be improved, enables communication to be performed stably.

Third Example Embodiment

A third example embodiment of the present invention will be described in detail with reference to the drawings. FIG. 14 is a diagram illustrating an outline of a configuration of an optical communication system according to the present example embodiment.

The optical communication system of the present example embodiment includes a transmission device 100 and a reception device 400. The transmission device 100 and the reception device 400 are interconnected via an optical fiber transmission line 301.

The optical communication system of the present example embodiment is, as with the second example embodiment, a digital optical communication system that transmits a wavelength-division-multiplexed optical signal from the transmission device 100 to the reception device 400 via the optical fiber transmission line 301. The optical communication system of the present example embodiment, as with the second example embodiment, performs communication, using the digital coherent method and the super-Nyquist transmission method.

In the second example embodiment, a filter coefficient of the band restoration processing filter is computed on the reception side, using a fixed value that is set in advance as a noise parameter. The present example embodiment is characterized in that, in place of such a configuration, a noise parameter is determined based on a result of measurement of noise in the optical fiber transmission line 301 and, using the noise parameter, a filter coefficient of a band restoration filter is computed.

The configurations and functions of the transmission device 100 and the optical fiber transmission line 301 of the present example embodiment are similar to those of the second example embodiment.

The reception device 400 includes a plurality of optical receivers 60 and a demultiplexer 52. The configuration and functions of the demultiplexer 52 of the present example embodiment are similar to those of the second example embodiment. The optical receivers 60 are provided in a corresponding number to the number of channels through which communication is performed in the optical communication system of the present example embodiment.

Figure 15:
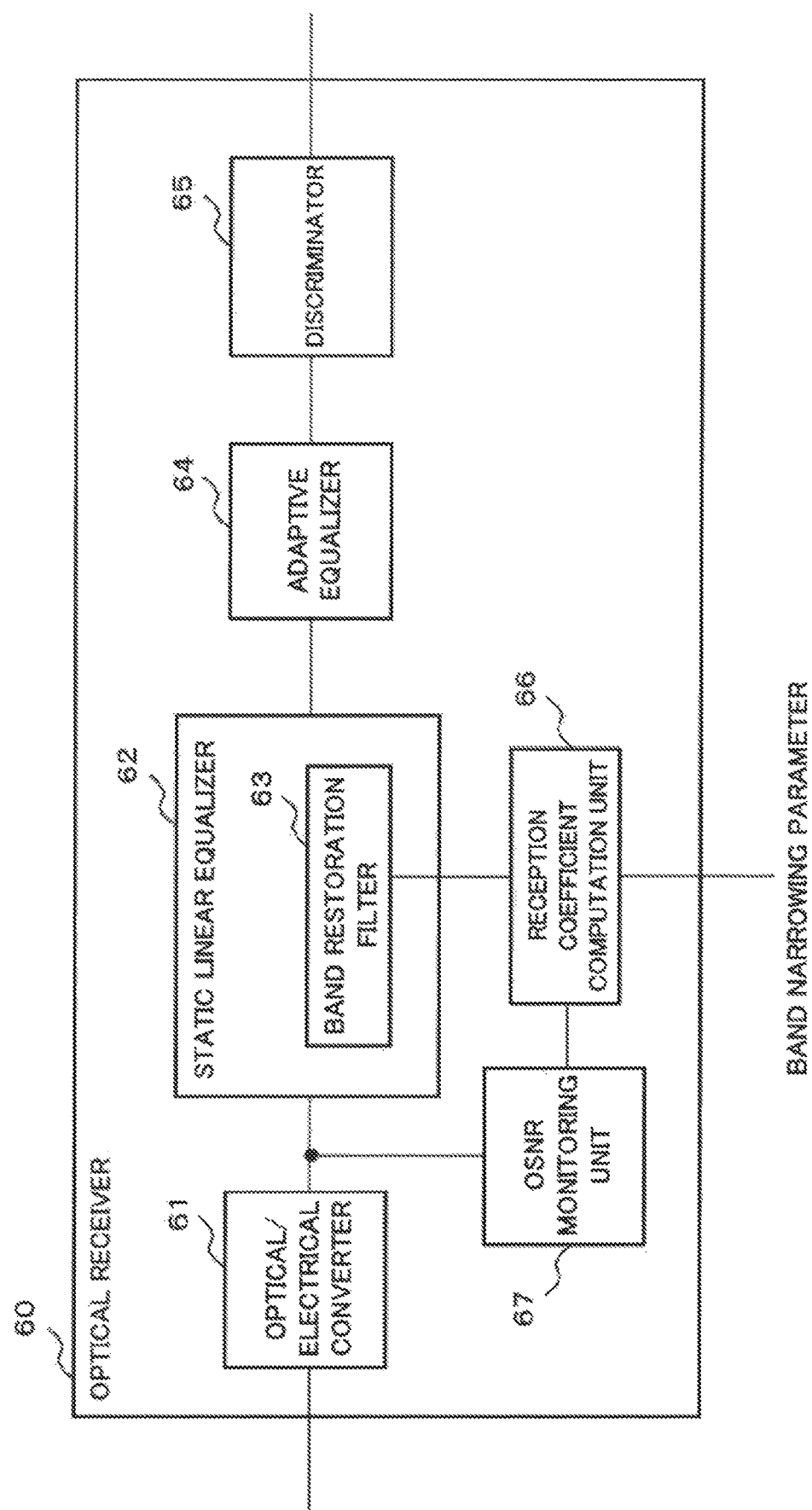
FIG. 15 is a diagram illustrating a configuration of an optical receiver of the third example embodiment according to the present invention.

A configuration of each optical receiver 60 will be described. FIG. 15 is a diagram illustrating the configuration of the optical receiver 60. The optical receiver 60 includes an optical/electrical converter 61, a static linear equalizer 62, an adaptive equalizer 64, a discriminator 65, a reception coefficient computation unit 66, and an optical signal to noise ratio (OSNR) monitoring unit 67. The static linear equalizer 62 further includes a band restoration filter 63. The configurations and functions of the optical/electrical converter 61, the static linear equalizer 62, the band restoration filter 63, the adaptive equalizer 64, and the discriminator 65 of the present example embodiment are similar to those of the components with the same names of the second example embodiment.

The reception coefficient computation unit 66 computes a filter coefficient of the band restoration filter 63, based on an MMSE criterion, using a band narrowing filter characteristic shared in advance with the optical transmitters 30 and an OSNR monitoring result of a reception signal input from the OSNR monitoring unit 67. The reception coefficient computation unit 66 sends a computation result of the filter coefficient of the band restoration filter 63 to the band restoration filter 63.

The reception coefficient computation unit 66 stores data indicating relationships between OSNR monitoring results of reception signals and noise parameters yin advance. The reception coefficient computation unit 66, for example, stores data indicating relationships between OSNR monitoring results of reception signals and optimum noise parameters γ as an approximate curve obtained by performing polynomial approximation on measurement data of correlations between OSNR monitoring results of reception signals and optimum noise parameters γ. Alternatively, the reception coefficient computation unit 66 may store data indicating relationships between OSNR monitoring results of reception signals and optimum noise parameters γ as a look-up table (LUT) based on measurement values of OSNRs of reception signals. The reception coefficient computation unit 66 computes an optimum noise parameter γ corresponding to an OSNR monitoring result of a reception signal, based on the data stored in advance and, using the noise parameter γ, performs computation of the filter coefficient. The data of the relationships between OSNR monitoring results of reception signals and optimum noise parameters rare, for example, created based on a result of measurement conducted at the time of manufacturing of the optical receiver 60, installation of the optical communication system, or the like.

The OSNR monitoring unit 67 monitors an output signal from the optical/electrical converter 61 and measures an OSNR of a reception signal. The OSNR monitoring unit 67 sends a measurement result of an OSNR of a reception signal to the reception coefficient computation unit 66 as an OSNR monitoring result.

Operation of the optical communication system of the present example embodiment will be described. In the optical communication system of the present example embodiment, operations in which the respective optical transmitters 30 in the transmission device 100 apply band narrowing filter processing to transmission original signals and the transmission device 100 transmits a wavelength-division-multiplexed signal are similar to those in the second example embodiment. In addition, in the optical communication system of the present example embodiment, operations in which the optical receivers 60 of the reception device 400 apply band restoration filter processing to reception signals, discriminate digital bit sequences using the discriminators 65, and output the discriminated digital bit sequences are also similar to those in the second example embodiment. That is, the optical communication system of the present example embodiment differs from the optical communication system of the second example embodiment only in an operation in which the reception coefficient computation units 66 compute filter coefficients of the band restoration filters 63, based on OSNR monitoring results. Therefore, in the following description, the operation in which the reception coefficient computation units 66 compute filter coefficients of the band restoration filters 63, based on OSNR monitoring results will be mainly described.

A multiplexed signal transmitted through the optical fiber transmission line 301 is separated into optical signals of the respective channels by the demultiplexer 52 in the reception device 400, and the separated optical signals are sent to the corresponding optical receivers 60. When an optical signal has been input to the optical/electrical converter 61 of each optical receiver 60, the optical signal is converted to an electrical signal, which is sent to the static linear equalizer 62 and the OSNR monitoring unit 67.

When a reception signal has been input, the OSNR monitoring unit 67 measures an OSNR of the reception signal and sends a measurement result to the reception coefficient computation unit 66 as an OSNR monitoring result. When having received the OSNR monitoring result, the reception coefficient computation unit 66 computes a noise parameter γ corresponding to the OSNR monitoring result of a reception signal, based on the data of relationships between OSNR monitoring results and noise parameters γ, which are stored in advance. When having determined a noise parameter γ corresponding to the OSNR monitoring result of the reception signal, the reception coefficient computation unit 66 computes a filter coefficient of the band restoration filter 63, based on a band narrowing filter characteristic stored in advance and the determined noise parameter γ. When having computed a filter coefficient of the band restoration filter 63, the reception coefficient computation unit 66 sends the computed filter coefficient to the band restoration filter 63.

When having received a reception signal and a filter coefficient, the band restoration filter 63 applies band restoration filter processing based on the filter coefficient received from the reception coefficient computation unit 66 to the reception signal. When having applied the band restoration filter processing, the band restoration filter 63 sends the reception signal that has been subjected to the band restoration to the adaptive equalizer 64. When having received the reception signal from the band restoration filter 63, the adaptive equalizer 64 applies adaptive equalization processing to the received reception signal and outputs the processed signal to the discriminator 65. When having received the reception signal from the adaptive equalizer 64, the discriminator 65 discriminates a digital bit sequence of the reception signal and outputs the discriminated signal as a bit sequence signal. Each optical receiver 60, while repeating optimization of the noise parameter γ, based on OSNR monitoring results through the above-described operations, continues operations of band restoration, decoding, and the like of reception signals.

The optical communication system of the present example embodiment has similar advantageous effects to those of the optical communication system of the second example embodiment. In addition, the optical communication system of the present example embodiment sets filter shapes of the band restoration filters in the reception coefficient computation units 66, based on noise parameters based on monitoring results from the OSNR monitoring units 67 of the optical receivers 60. For this reason, the optical communication system of the present example embodiment is capable of setting shapes of the band restoration filters, taking into consideration noise actually occurring in the optical fiber transmission line 301, and accuracy of signal restoration is thereby improved and communication is further stabilized. As a result, the optical communication system of the present example embodiment, while enabling a plurality of subcarrier signals to be multiplexed at spacings less than or equal to a baud rate and thereby enabling frequency usage efficiency to be improved, enables communication to be performed more stably.

Fourth Example Embodiment

Figure 16:
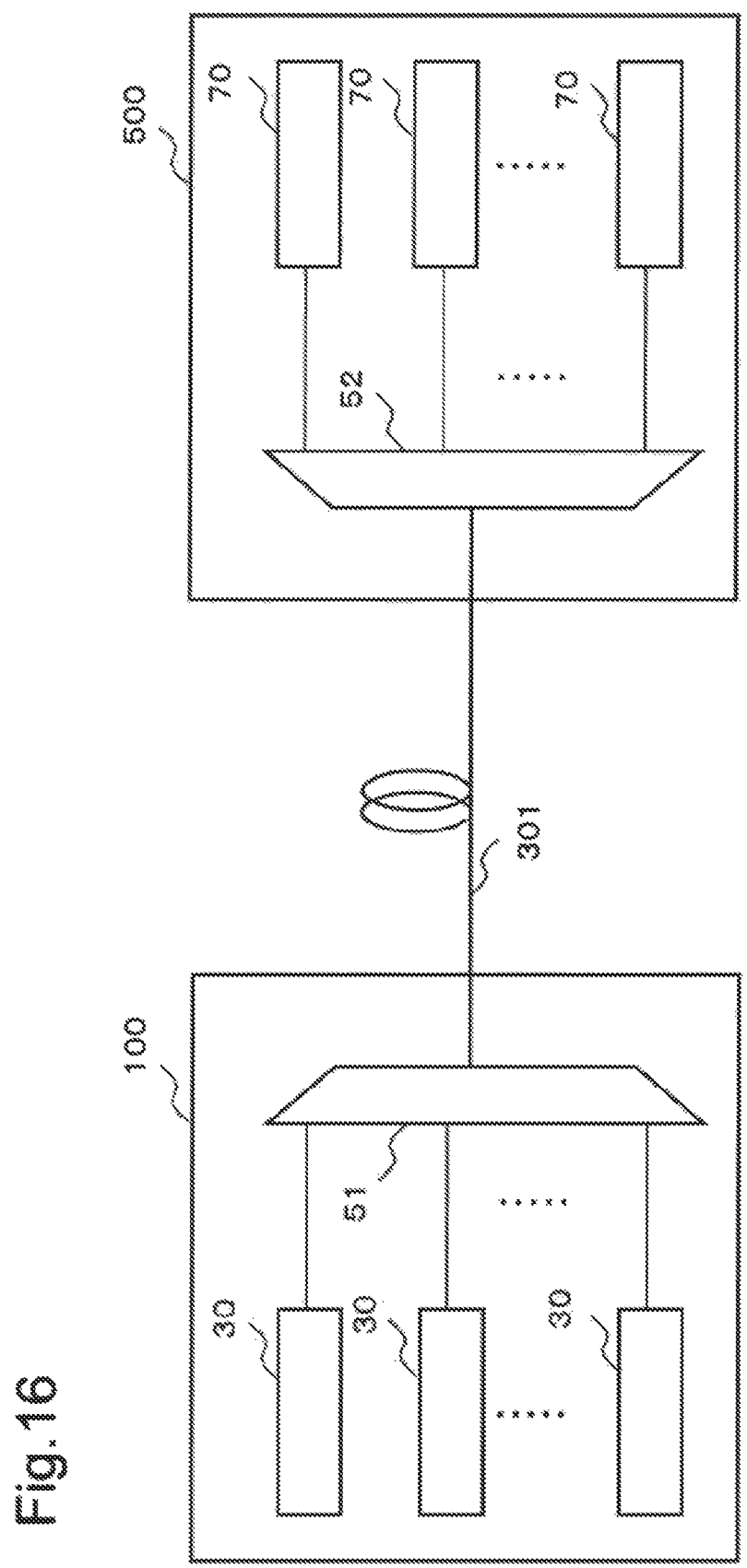
FIG. 16 is a diagram illustrating an outline of a configuration of a fourth example embodiment according to the present invention.

A fourth example embodiment of the present invention will be described in detail with reference to the drawings. FIG. 16 is a diagram illustrating a configuration of an optical communication system according to the present example embodiment. The optical communication system of the present example embodiment includes a transmission device 100 and a reception device 500. The transmission device 100 and the reception device 500 are interconnected via an optical fiber transmission line 301.

The optical communication system of the present example embodiment is, as with the second example embodiment, a digital optical communication system that transmits a wavelength-division-multiplexed optical signal from the transmission device 100 to the reception device 500 via the optical fiber transmission line 301. The optical communication system of the present example embodiment, as with the second example embodiment, performs communication, using the digital coherent method and the super-Nyquist transmission method.

While, in the third example embodiment, a noise parameter is optimized based on an OSNR monitoring result of a reception signal, the present example embodiment is characterized in that a noise parameter is optimized using a final bit error rate (BER) in addition to the OSNR.

The configurations and functions of the transmission device 100 and the optical fiber transmission line 301 of the present example embodiment are similar to those of the second example embodiment.

The reception device 500 includes a plurality of optical receivers 70 and a demultiplexer 52. The configuration and functions of the demultiplexer 52 of the present example embodiment are similar to those of the demultiplexer 52 of the third example embodiment. Number of the provided optical receivers 70 corresponds to that of channels through which communication is performed in the optical communication system of the present example embodiment.

Figure 17:
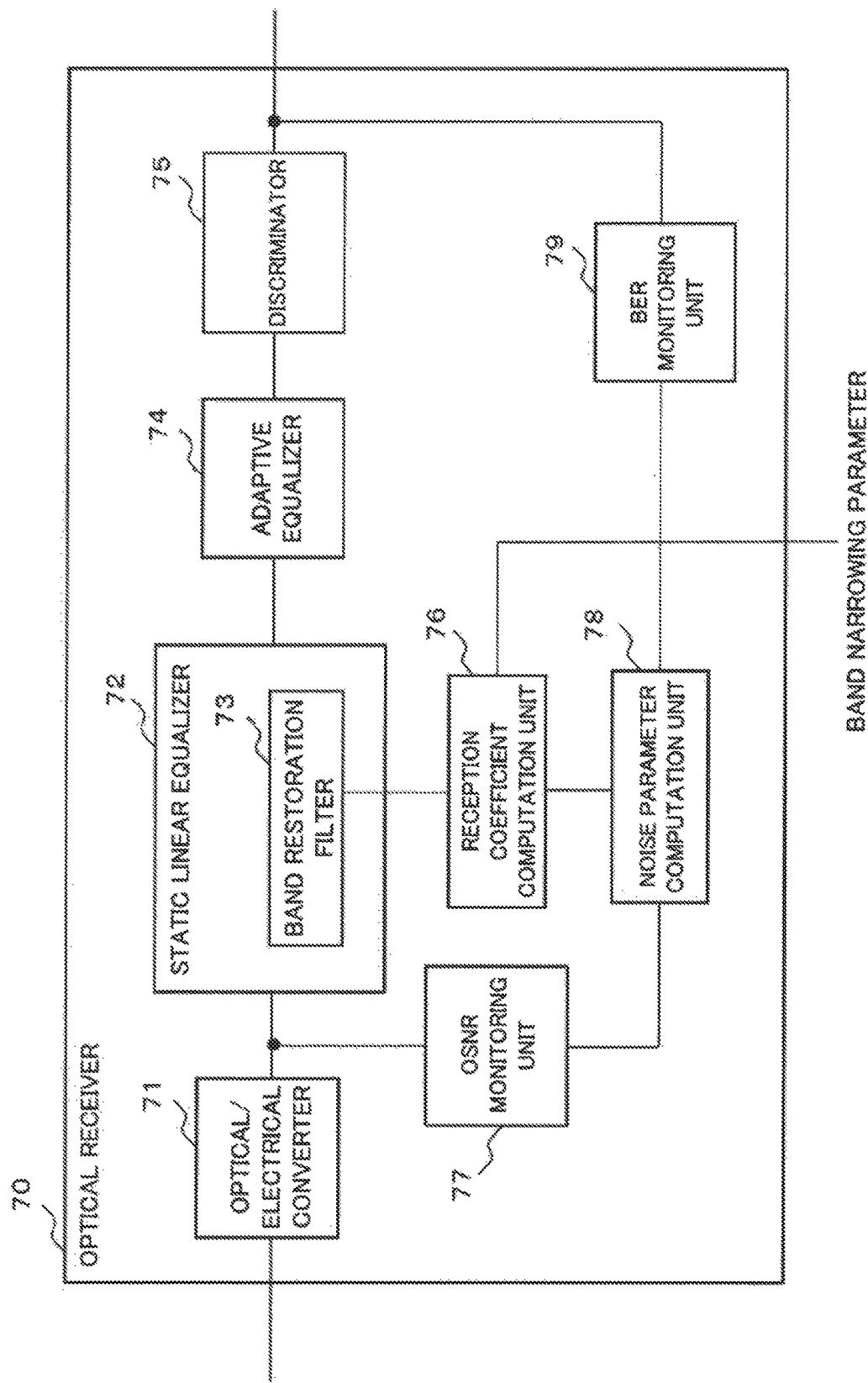
FIG. 17 is a diagram illustrating a configuration of an optical receiver of the fourth example embodiment according to the present invention.

A configuration of each optical receiver 70 will be described. FIG. 17 is a diagram illustrating the configuration of the optical receiver 70. The optical receiver 70 includes an optical/electrical converter 71, a static linear equalizer 72, an adaptive equalizer 74, a discriminator 75, a reception coefficient computation unit 76, an OSNR monitoring unit 77, a noise parameter computation unit 78, and a BER monitoring unit 79. The static linear equalizer 72 further includes a band restoration filter 73. The configurations and functions of the optical/electrical converter 71, the static linear equalizer 72, the band restoration filter 73, the adaptive equalizer 74, and the discriminator 75 of the present example embodiment are similar to those of the components with the same names of the second example embodiment.

The reception coefficient computation unit 76 computes a filter coefficient of the band restoration filter 73, based on a band narrowing parameter shared in advance with optical transmitters 30 and a noise parameter γ input from the noise parameter computation unit 78. The reception coefficient computation unit 76 computes the filter coefficient of the band restoration filter 73 in a similar manner to the second example embodiment, using the noise parameter γ input from the noise parameter computation unit 78. The reception coefficient computation unit 76 sends the computed filter coefficient of the band restoration filter 73 to the band restoration filter 73.

The OSNR monitoring unit 77 monitors an output signal from the optical/electrical converter 71 and measures an OSNR of a reception signal. The OSNR monitoring unit 77 sends a measurement result of the OSNR of the reception signal to the noise parameter computation unit 78 as an OSNR monitoring result.

The noise parameter computation unit 78 computes a noise parameter γ, based on an OSNR monitoring result sent from the OSNR monitoring unit 77 and BER information sent from the BER monitoring unit 79. When the noise parameter computation unit 78 is in an initial state, that is, no BER has been input, the noise parameter computation unit 78 determines a noise parameter γ in a similar manner to the reception coefficient computation unit 66 of the fourth example embodiment. That is, in the initial state, the noise parameter computation unit 78 determines a noise parameter γ, based on an OSNR monitoring result, using an approximate curve or an LUT.

When having received an OSNR monitoring result and BER data, the noise parameter computation unit 78, finely modifying the noise parameter γ in such a way that the BER value becomes minimum, finds an optimum noise parameter γ and sets the found value to the noise parameter γ. The noise parameter computation unit 78 controls the noise parameter γ in two stages, namely a rough adjustment stage in which the noise parameter γ is computed only from an OSNR monitoring result and can thus be set in a short period of time and an optimization adjustment stage in which the noise parameter γ is optimized based on an OSNR monitoring result and feedback of the BER data. Since setting of the noise parameter γ in such a manner enables an optimum noise parameter γ to be set without impairing convergence of the adaptive equalizer 74 at the succeeding stage, it is possible to achieve desirable transmission characteristics to the greatest extent possible.

The BER monitoring unit 79 monitors an output signal from the discriminator 75 and measures a bit error rate. The BER monitoring unit 79 sends a measurement result of the bit error rate to the noise parameter computation unit 78 as BER information.

The BER monitoring unit 79, for example, monitors error correction processing that uses error correction codes added by the transmission device 100 and measures a bit error rate, based on a rate of error correction. The error correction is, for example, performed in accordance with forward error correction (FEC).

Operation of the optical communication system of the present example embodiment will be described. In the optical communication system of the present example embodiment, operations in which the respective optical transmitters 30 in the transmission device 100 apply band narrowing filter processing to transmission original signals and the transmission device 100 transmits an optical signal are similar to those in the second example embodiment. In addition, in the optical communication system of the present example embodiment, operations in which the optical receivers 70 in the reception device 500 apply band restoration filter processing to reception signals, discriminate digital bit sequences, using the discriminators 75, and output the discriminated digital bit sequences are also similar to those in the second example embodiment. That is, the optical communication system of the present example embodiment differs from the optical communication system of the second example embodiment only in an operation in which the reception coefficient computation units 76 computes filter coefficients of the band restoration filters 73, based on OSNR monitoring results and BER information. Therefore, in the following description, the operation in which the reception coefficient computation units 76 computes filter coefficients of the band restoration filters 73, based on OSNR monitoring results and BER information will be mainly described.

A multiplexed signal transmitted through the optical fiber transmission line 301 is separated into optical signals of the respective channels by the demultiplexer 52 in the reception device 500, and the separated optical signals are sent to the corresponding optical receivers 70. When an optical signal has been input to the optical/electrical converter 71 of each optical receiver 70, the optical signal is converted to an electrical signal, which is sent to the static linear equalizer 72 and the OSNR monitoring unit 77.

When a reception signal has been input, the OSNR monitoring unit 77 measures an OSNR of the reception signal and sends a measurement result to the noise parameter computation unit 78 as an OSNR monitoring result. When having received the OSNR monitoring result, the noise parameter computation unit 78 determines a noise parameter γ corresponding to the OSNR monitoring result of a reception signal, based on data of relationships between OSNR monitoring results and noise parameters γ, which are stored in advance. When having determined a noise parameter γ corresponding to the OSNR monitoring result of the reception signal, the noise parameter computation unit 78 sends the noise parameter γ to the reception coefficient computation unit 76. When having received the noise parameter γ, the reception coefficient computation unit 76 computes a filter coefficient of the band restoration filter 73, based on a band narrowing filter characteristic stored in advance and the received noise parameter γ. When having computed a filter coefficient of the band restoration filter 73, the reception coefficient computation unit 76 sends the computed filter coefficient to the band restoration filter 73.

When having received the reception signal and the filter coefficient, the band restoration filter 73 applies band restoration filter processing based on the received filter coefficient to the reception signal and sends the reception signal that has been subjected to the band restoration to the adaptive equalizer 74. When having received the reception signal from the band restoration filter 73, the adaptive equalizer 74 applies adaptive equalization processing to the received signal and outputs the processed signal to the discriminator 75.

When having received the reception signal from the adaptive equalizer 74, the discriminator 75 discriminates a digital bit sequence of the reception signal and outputs the discriminated signal as a data sequence signal.

The BER monitoring unit 79 monitors an output signal from the discriminator 75 and measures a bit error rate. When having measured a bit error rate, the BER monitoring unit 79 sends a measurement result to the noise parameter computation unit 78 as BER information.

When having received the BER information, the noise parameter computation unit 78 revises a value of the noise parameter $\gamma$, based on an OSNR monitoring result input from the OSNR monitoring unit 77 and the BER information. The noise parameter computation unit 78, for example, determines the noise parameter $\gamma$ to be output by computing a noise parameter, based on the OSNR monitoring result input from the OSNR monitoring unit 77 and correcting the noise parameter in such a way that the BER becomes minimum.

When having determined a noise parameter $\gamma$, the noise parameter computation unit 78 sends the noise parameter $\gamma$ to the reception coefficient computation unit 76. When having received the noise parameter $\gamma$, the reception coefficient computation unit 76 computes a filter coefficient of the band restoration filter 73, based on the band narrowing filter characteristic stored in advance and the received noise parameter $\gamma$. When having computed a filter coefficient of the band restoration filter 73, the reception coefficient computation unit 76 sends the computed filter coefficient to the band restoration filter 73.

When having received the reception signal and the filter coefficient, the band restoration filter 73 applies the band restoration filter processing to the reception signal, based on the newly-received filter coefficient and sends the reception signal that has been subjected to the band restoration to the adaptive equalizer 74. When having received the reception signal from the band restoration filter 73, the adaptive equalizer 74 applies adaptive equalization processing to the received signal and outputs the processed signal to the discriminator 75.

When having received the reception signal from the adaptive equalizer 74, the discriminator 75 discriminates a digital bit sequence of the reception signal and outputs the discriminated signal as a bit sequence signal.

The BER monitoring unit 79 monitors an output signal from the discriminator 75, sends a BER value to the noise parameter computation unit 78, and thereby performs feedback again. Each optical receiver 70, while repeating optimization of the noise parameter $\gamma$, based on OSNR monitoring results and BER information through the above-described operations, continues operations of band restoration, decoding, and the like of reception signals.

Complete optimization cannot be achieved by the method of computing the noise parameter $\gamma$ only from OSNR monitoring results because the optimum noise parameter $\gamma$ varies depending on preconditions, such as transmission line characteristics and transmitter/receiver characteristics. In order to perform complete optimization, it is required to adjust the noise parameter $\gamma$ in such a way that the final bit error rate becomes minimum. However, since the BER information is information including all transmission deterioration factors, it is difficult to compute the noise parameter $\gamma$ directly from the BER information. Therefore, it is required to perform BER measurement while finely changing the noise parameter $\gamma$, and it thus takes a certain amount of time to optimize the noise parameter $\gamma$. Since the noise parameter $\gamma$ largely apart from the optimum value causes the band restoration filter characteristic to change significantly, there is a possibility that such a noise parameter $\gamma$ brings about a fatal problem, such as loss of synchronization.

In the optical communication system of the present example embodiment, the noise parameter computation unit 78 first computes a noise parameter $\gamma$ that is close to an optimum value only from the OSNR monitoring information. The noise parameter $\gamma$ computed only from the OSNR monitoring information is transferred to the reception coefficient computation unit 76, and computation of a filter coefficient of the band restoration filter, based on the noise parameter $\gamma$ and a band narrowing parameter in accordance with an MMSE criterion is performed. Since the band restoration filter processing is performed under the condition that the band restoration filter processing has been optimized to some degree by the band restoration filter 73, based on the filter coefficient computed in such a manner, convergence of the adaptive equalizer 74 at the succeeding stage is not impaired. Thus, each optical receiver 70 can start reception operation, requiring little time after commencement of communication.

After the reception operation has been started by the band restoration filter based on the noise parameter $\gamma$ only from the OSNR monitoring result, the noise parameter computation unit 78 fine-tunes the noise parameter $\gamma$ in such a way that the BER becomes minimum. The noise parameter computation unit 78 feeds back the BER information in addition to the noise parameter $\gamma$ computed from the OSNR monitoring result and thereby fine-tunes the noise parameter $\gamma$ in such a way that the BER becomes minimum. That is, in the present example embodiment, optimization adjustment in two stages, namely a stage in which the noise parameter $\gamma$ is roughly adjusted in a short period of time using the OSNR monitoring result and a stage in which the noise parameter $\gamma$ is optimized by fine-tuning the noise parameter $\gamma$, further using the BER information, is performed. Since the optimization of the noise parameter $\gamma$ by the method described above enables the optical communication system of the present example embodiment to establish communication promptly and, at the same time, optimize conditions, based on a measurement result of the bit error rate at the time of reception operation, the optical communication system can continue stable communication.

The optical communication system of the present example embodiment has similar advantageous effects to those of the optical communication systems of the second and third example embodiments. In addition, the optical communication system of the present example embodiment computes noise parameters, taking into consideration bit error rates monitored by the BER monitoring units 79 in addition to OSNR monitoring results. Setting of filter shapes of wavelength restoration filters in the reception coefficient computation unit 76, based on the noise parameters computed in such a manner enables optimum filter shapes according to reception signals to be set. Since it is thus possible to perform the adaptive equalization processing and the like at the succeeding stages more stably, it is possible to improve stability of communication. As a result, the optical communication system of the present example embodiment, while enabling a plurality of subcarrier signals to be multiplexed at spacings less than or equal to a baud rate and thereby enabling frequency usage efficiency to be improved, enables communication to be performed more stably.

Although, in the first to fourth example embodiments, configuration examples in which optical transmitters and optical receivers are provided in a single transmission device and a single reception device, respectively, were described, the optical transmitters and the optical receivers may be provided to a plurality of devices in a divided manner. In a case of such a configuration, a multiplexer and a demultiplexer are placed according to an arrangement of the optical transmitters and the optical receivers in such a way that multiplexing and demultiplexing of optical signals can be done.

The transmission linear equalizer and the transmission coefficient computation unit in an optical transmitter of each of the second to fourth example embodiments can, for example, be configured using semiconductor devices in which circuits for performing processing of the respective functions are formed. In addition, the static linear equalizer, the adaptive equalizer, the discriminator, and the reception coefficient computation unit in an optical receiver of each of the second to fourth example embodiments can, for example, be configured using semiconductor devices in which circuits for performing processing of the respective functions are formed. The OSNR monitoring unit of the third example embodiment and the OSNR monitoring unit, the noise parameter computation unit, and the BER monitoring unit of the fourth example embodiment can also be configured using semiconductor devices in which circuits for performing processing of the respective functions are formed, in a similar manner. The processing in the above-described respective components may be performed by executing programs performing processing of the respective functions in a device constituted by a central processing unit (CPU), a memory element, and the like.

The whole or part of the example embodiments disclosed above can be described as, but not limited to, the following supplementary notes.

(Supplementary Note 1)

A reception device comprising:

a separation means for separating a multiplexed signal into which signals of respective channels to which spectral shaping that narrows bandwidth to less than or equal to a baud rate is applied as band narrowing filter processing are multiplexed at spacings less than or equal to the baud rate into optical signals for the respective channels; and a plurality of optical reception means each of which comprises an optical/electrical conversion means for converting the optical signal of the assigned channel to an electrical signal and outputting the electrical signal as a reception signal and a band restoration means for applying processing having inverse characteristics to those of the band narrowing filter processing to the reception signal as band restoration filter processing, based on a parameter shared in advance with a transmission side and thereby restoring a band of the reception signal.

(Supplementary Note 2)

The reception device according to supplementary note 1 further comprising a reception filter characteristic computation means for, based on the parameter shared in advance with the transmission side and a noise parameter indicating noise in the optical signal, computing a filter characteristic when the band restoration filter processing is applied, wherein each of the band restoration means applies the band restoration filter processing, based on the filter characteristic.

(Supplementary Note 3)

The reception device according to supplementary note 2 further comprising a noise measurement means for measuring noise in the optical signal, wherein the reception filter characteristic computation means, based on a noise parameter based on noise that the noise measurement means has measured and the parameter, computes the filter characteristic when the band restoration filter processing is applied.

(Supplementary Note 4)

The reception device according to supplementary note 3, wherein the noise parameter is set based on noise in the optical signal that the noise measurement means has measured and an approximate curve or a look-up table set in advance.

(Supplementary Note 5)

The reception device according to any one of supplementary notes 2 to 4 further comprising:

an error rate monitoring means for monitoring a bit error rate when the electrical signal the band of which has been restored is decoded; and a noise parameter computation means for, based on noise in the optical signal and the bit error rate, computing the noise parameter, wherein the noise parameter computation means, based on the bit error rate when decoding was performed based on the noise parameter having been computed based on noise in the optical signal, optimizes the noise parameter.

(Supplementary Note 6)

The reception device according to any one of supplementary notes 2 to 5, wherein the reception filter characteristic computation means, based on a minimum mean square error (MMSE) criterion, computes the filter characteristic.

(Supplementary Note 7)

A transmission device comprising:

a plurality of optical transmission means each of which comprises a band narrowing means for applying processing of performing spectral shaping that narrows bandwidth of a signal to less than or equal to a baud rate as band narrowing filter processing, based on a parameter shared in advance with a reception side and an electrical/optical conversion means for, based on the signal the bandwidth of which the band narrowing means has narrowed to less than or equal to the baud rate, generating an optical signal corresponding to an assigned channel; and a multiplexing means for multiplexing the optical signals of respective channels output from the plurality of optical transmission means into a multiplexed signal at spacings less than or equal to the baud rate and outputting the multiplexed signal.

(Supplementary Note 8)

The transmission device according to supplementary note 7, wherein the band narrowing filter processing comprises a transmission filter characteristic computation means for computing a filter characteristic that is obtained by shifting in parallel a roll-off characteristic of a root cosine roll-off filter to a low frequency side, and each of the band narrowing means applies the band narrowing filter processing, based on the filter characteristic that the transmission filter characteristic computation means has computed.

(Supplementary Note 9)

An optical communication system comprising:

a transmission device according to supplementary note 7 or 8; and a reception device according to any one of supplementary notes 1 to 6, wherein a multiplexed signal into which signals of respective channels are multiplexed at spacings less than or equal to a baud rate is transmitted from the transmission device to the reception device via a transmission line.

(Supplementary Note 10)

An optical communication method comprising:

separating a multiplexed signal into which signals of respective channels to which spectral shaping that narrows bandwidth to less than or equal to a baud rate is applied as band narrowing filter processing are multiplexed at spacings less than or equal to the baud rate into optical signals for the respective channels;

converting the optical signals of the assigned channels to electrical signals and outputting the electrical signals as reception signals; and applying processing having inverse characteristics to those of the band narrowing filter processing to the reception signals as band restoration filter processing, based on a parameter shared in advance with a transmission side and thereby restoring bands of the reception signals.

(Supplementary Note 11)

The optical communication method according to supplementary note 10 further comprising:

based on the parameter shared in advance with the transmission side and a noise parameter indicating noise in the optical signals, computing filter characteristics when the band restoration filter processing is applied; and applying the band restoration filter processing, based on the filter characteristics.

(Supplementary Note 12)

The optical communication method according to supplementary note 11 further comprising:

measuring noise in the optical signals; and based on a noise parameter based on measured noise and the parameter, computing the filter characteristics when the band restoration filter processing is applied.

(Supplementary Note 13)

The optical communication method according to supplementary note 11 or 12, wherein the noise parameter is set based on measured noise in the optical signals and an approximate curve or a look-up table set in advance.

(Supplementary Note 14)

The optical communication method according to any one of supplementary notes 11 to 13 further comprising:

monitoring bit error rates when the electrical signals the bands of which have been restored are decoded;

computing the noise parameter, based on noise in the optical signals; and based on the bit error rates when decoding was performed based on the noise parameter having been computed based on noise in the optical signals, optimizing the noise parameter.

(Supplementary Note 15)

The optical communication method according to any one of supplementary notes 11 to 14, wherein the filter characteristics are computed based on an MMSE criterion.

(Supplementary Note 16)

The optical communication method according to any one of supplementary notes 10 to 15 further comprising:

applying the band narrowing filter processing of performing spectral shaping that narrows bandwidth of respective ones of a plurality of the signals to less than or equal to a baud rate, based on the parameter shared in advance with a reception side;

generating the optical signals corresponding to the channels assigned to the signals, based on a plurality of the signals the bandwidth of which has been narrowed to less than or equal to the baud rate; and multiplexing the optical signals of a plurality of the channels into the multiplexed signal at spacings less than or equal to the baud rate and outputting the multiplexed signal.

(Supplementary Note 17)

The optical communication method according to supplementary note 16, wherein the filter characteristics of the band narrowing filter processing is computed by shifting in parallel a roll-off characteristic of a root cosine roll-off filter to a low frequency side, and the band narrowing filter processing is applied based on the computed filter characteristics.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2016-255189, filed on Dec. 28, 2016, the disclosure of which is incorporated herein in its entirety by reference.

REFERENCE SIGNS LIST

10 Transmission device
11 Optical transmission means
12 Multiplexing means
13 Band narrowing means
14 Electrical/optical conversion means
20 Reception device
21 Separation means
22 Optical reception means
23 Optical/electrical conversion means
24 Band restoration means
30 Optical transmitter
31 Transmission linear equalizer
32 Band narrowing filter
33 Electrical/optical converter
34 Transmission coefficient computation unit
40 Optical receiver
41 Optical/electrical converter
42 Static linear equalizer
43 Band restoration filter
44 Adaptive equalizer
45 Discriminator
46 Reception coefficient computation unit
47 Multiplexer
48 Demultiplexer
60 Optical receiver
61 Optical/electrical converter
62 Static linear equalizer
63 Band restoration filter
64 Adaptive equalizer
65 Discriminator
66 Reception coefficient computation unit
67 OSNR monitoring unit 70 Optical receiver
71 Optical/electrical converter
72 Static linear equalizer
73 Band restoration filter
74 Adaptive equalizer
75 Discriminator
76 Reception coefficient computation unit
77 OSNR monitoring unit
78 Noise parameter computation unit
79 BER monitoring unit
100 Transmission device
200 Reception device
300 Transmission line
301 Optical fiber transmission line
400 Reception device
500 Reception device

What is claimed is:

1. A reception device comprising:
a separation unit which separates a multiplexed signal into optical signals for respective channels, the multiplexed signal being obtained by applying, to signals of the respective channels, spectral shaping that narrows bandwidth to less than or equal to a baud rate based on a parameter as band narrowing filter processing, and multiplexing the signals at intervals less than or equal to the baud rate; and
a plurality of optical reception units each of which comprises an optical/electrical conversion unit which converts the optical signal of the assigned channel to an electrical signal and outputs the electrical signal as a reception signal, and a band restoration unit which applies, to the reception signal, processing having inverse characteristics to those of the band narrowing filter processing based on the parameter as band restoration filter processing and thereby restores a band of the reception signal.

2. The reception device according to claim 1 further comprising
a reception filter characteristic computation unit which, based on the parameter and a noise parameter indicating noise in the optical signal, computes a filter characteristic when the band restoration filter processing is applied, wherein
each of the band restoration units applies the band restoration filter processing, based on the filter characteristic.

3. The reception device according to claim 2 further comprising
a noise measurement unit which measures noise in the optical signal, wherein
the reception filter characteristic computation unit, based on a noise parameter based on noise that the noise measurement unit has measured and the parameter, computes the filter characteristic when the band restoration filter processing is applied.

4. The reception device according to claim 3, wherein
the noise parameter is set based on noise in the optical signal that the noise measurement unit has measured and an approximate curve or a look-up table set in advance.

5. The reception device according to claim 2 further comprising:
an error rate monitoring unit which monitors a bit error rate when the electrical signal the band of which has been restored is decoded; and
a noise parameter computation unit which, based on noise in the optical signal and the bit error rate, computes the noise parameter, wherein
the noise parameter computation unit, based on the bit error rate when decoding was performed based on the noise parameter having been computed based on noise in the optical signal, optimizes the noise parameter.

6. The reception device according to claim 2, wherein
the reception filter characteristic computation unit, based on a minimum mean square error (MMSE) criterion, computes the filter characteristic.

7. A transmission device comprising:
a plurality of optical transmission units each of which comprises a band narrowing unit which applies processing of performing spectral shaping that narrows bandwidth of a signal to less than or equal to a baud rate as band narrowing filter processing, based on a parameter, and an electrical/optical conversion unit which, based on the signal with the bandwidth that the band narrowing unit has narrowed to less than or equal to the baud rate, generates an optical signal corresponding to an assigned channel; and
a multiplexing unit which multiplexes the optical signals of respective channels output from the plurality of optical transmission units into a multiplexed signal at intervals less than or equal to the baud rate and outputs the multiplexed signal.

8. The transmission device according to claim 7 further comprising
a transmission filter characteristic computation unit which computes a filter characteristic that is obtained by shifting in parallel a roll-off characteristic of a root cosine roll-off filter to a low frequency side, wherein
each of the band narrowing units applies the band narrowing filter processing, based on the filter characteristic that the transmission filter characteristic computation unit has computed.

9. An optical communication system comprising:
a transmission device which comprises a plurality of optical transmission units each of which comprises a band narrowing unit which applies processing of performing spectral shaping that narrows bandwidth of a signal to less than or equal to a baud rate as band narrowing filter processing, based on a parameter, and an electrical/optical conversion unit, based on the signal with the bandwidth that the band narrowing unit has narrowed to less than or equal to the baud rate, which generates an optical signal corresponding to a respectively assigned channel; and
a multiplexing unit which multiplexes the optical signals of respective channels output from the plurality of optical transmission units into a multiplexed signal at intervals less than or equal to the baud rate and outputs the multiplexed signal; and
a reception device according to claim 1, wherein
a multiplexed signal into which signals of respective channels are multiplexed at intervals less than or equal to a baud rate is transmitted from the transmission device to the reception device via a transmission line.

10. An optical communication method comprising:
separating a multiplexed signal into optical signals for respective channels, the multiplexed signal being obtained by applying, to signals of the respective channels to which spectral shaping that narrows bandwidth to less than or equal to a baud rate based on a parameter as band narrowing filter processing and multiplexing the signals at intervals less than or equal to the baud rate;

converting the optical signals of the assigned channels to electrical signals and outputting the electrical signals as reception signals; and applying, to the reception signals, processing having inverse characteristics to those of the band narrowing filter processing based on the parameter as band restoration filter processing and thereby restoring bands of the reception signals.

11. The optical communication method according to claim 10 further comprising:

based on the parameter and a noise parameter indicating noise in the optical signals, computing filter characteristics when the band restoration filter processing is applied; and applying the band restoration filter processing, based on the filter characteristics.

12. The optical communication method according to claim 11 further comprising:

measuring noise in the optical signals; and based on a noise parameter based on measured noise and the parameter, computing the filter characteristics when the band restoration filter processing is applied.

13. The optical communication method according to claim 11, wherein the noise parameter is set based on measured noise in the optical signals and an approximate curve or a look-up table set in advance.

14. The optical communication method according to claim 11 further comprising:

monitoring bit error rates when the electrical signals the bands of which have been restored are decoded;

computing the noise parameter, based on noise in the optical signals; and based on the bit error rates when decoding was performed based on the noise parameter having been computed based on noise in the optical signals, optimizing the noise parameter.

15. The optical communication method according to claim 11, wherein the filter characteristics are computed based on an MMSE criterion.

16. The optical communication method according to claim 10 further comprising:

applying the band narrowing filter processing of performing spectral shaping that narrows bandwidth of respective ones of a plurality of the signals to less than or equal to a baud rate, based on the parameter;

generating the optical signals corresponding to the channels assigned to the signals, based on a plurality of the signals with the bandwidth that has been narrowed to less than or equal to the baud rate; and multiplexing the optical signals of a plurality of the channels into the multiplexed signal at intervals less than or equal to the baud rate and outputting the multiplexed signal.

17. The optical communication method according to claim 16, wherein the filter characteristics of the band narrowing filter processing is computed by shifting in parallel a roll-off characteristic of a root cosine roll-off filter to a low frequency side, and the band narrowing filter processing is applied based on the computed filter characteristics.

* * * * *